United States Patent
Sauder et al.

(10) Patent No.: US 12,232,440 B2
(45) Date of Patent: Feb. 25, 2025

(54) CROP INPUT APPLICATION SYSTEMS, METHODS, AND APPARATUS

(71) Applicant: MA Industries, LLC, Morton, IL (US)

(72) Inventors: Greggory Sauder, Morton, IL (US); Timothy Sauder, Morton, IL (US); Justin Koch, Morton, IL (US); Nowell Moore, Morton, IL (US); Reid Aberle, Morton, IL (US); Tyler Nafzinger, Morton, IL (US); Connor Hesterberg, Morton, IL (US); Jonathan Welte, Morton, IL (US); Kyle Waremburg, Morton, IL (US); Steven Nuest, Morton, IL (US)

( * ) Notice: Subject to any disclaimer, the term of this patent is extended or adjusted under 35 U.S.C. 154(b) by 505 days.

(21) Appl. No.: 17/596,825

(22) PCT Filed: Jun. 18, 2020

(86) PCT No.: PCT/US2020/038437
§ 371 (c)(1),
(2) Date: Dec. 17, 2021

(87) PCT Pub. No.: WO2020/257456
PCT Pub. Date: Dec. 24, 2020

(65) Prior Publication Data
US 2022/0232759 A1   Jul. 28, 2022

Related U.S. Application Data

(60) Provisional application No. 62/883,579, filed on Aug. 6, 2019, provisional application No. 62/862,953, filed on Jun. 18, 2019.

(51) Int. Cl.
| | | |
|---|---|---|
| A01C 23/04 | (2006.01) | |
| A01G 25/09 | (2006.01) | |
| A01G 25/16 | (2006.01) | |

(52) U.S. Cl.
CPC .......... *A01C 23/042* (2013.01); *A01G 25/092* (2013.01); *A01G 25/095* (2013.01); *A01G 25/167* (2013.01)

(58) Field of Classification Search
CPC ...... A01G 25/092; A01G 25/16; A01G 25/09; A01G 25/02; A01G 25/095; A01G 25/097;
(Continued)

(56) References Cited

U.S. PATENT DOCUMENTS

| | | |
|---|---|---|
| 3,753,409 A | 8/1973 | Frazier |
| 4,488,683 A | 12/1984 | Chiel |

(Continued)

FOREIGN PATENT DOCUMENTS

| | | |
|---|---|---|
| EP | 0384867 A1 | 8/1990 |
| FR | 2 969 461 | 6/2012 |

OTHER PUBLICATIONS

Extended European Search Report in European Application No. 20827236.9, dated Jun. 26, 2023, 10 pages.
(Continued)

*Primary Examiner* — Jeffrey R Larsen
(74) *Attorney, Agent, or Firm* — Todd R. Fronek; Larkin Hoffman

(57) ABSTRACT

Crop input application systems, methods and apparatus are provided. In some embodiments, an irrigation system is provided with a reel in fluid communication with a liquid source. In some embodiments, a drop assembly is incorporated in an irrigation system. In some embodiments, a crop applicator system includes a reel positioned between adjacent rows of crop.

24 Claims, 36 Drawing Sheets

(58) Field of Classification Search
CPC ... A01C 23/042; A01C 23/047; A01C 23/001; A01C 23/021; A01C 23/008; B65H 2701/333; B65H 75/425; B65H 75/4407; B65H 75/4481; B65H 2701/33; B65H 75/4413; B65H 75/30; B65H 75/4442; B65H 75/4402; A01M 7/0042; B60P 3/035

See application file for complete search history.

(56) References Cited

U.S. PATENT DOCUMENTS

| | | | |
|---|---|---|---|
| 5,020,730 A * | 6/1991 | Perroud | A01G 25/095 239/63 |
| 5,741,090 A | 4/1998 | Dunning et al. | |
| 5,755,058 A * | 5/1998 | Guyot | A01C 21/00 239/727 |
| 6,254,018 B1 | 7/2001 | Ostrom | |
| 9,167,745 B2 | 10/2015 | Muff | |
| 2012/0126047 A1 | 5/2012 | Skowronski et al. | |
| 2014/0263698 A1 | 9/2014 | Young et al. | |
| 2014/0297242 A1 | 10/2014 | Sauder et al. | |
| 2014/0361093 A1 * | 12/2014 | Alig | B65H 75/4413 239/159 |
| 2016/0157445 A1 * | 6/2016 | Mortensen | B05B 1/20 239/728 |
| 2016/0227755 A1 | 8/2016 | Preheim et al. | |
| 2016/0235019 A1 | 8/2016 | Manghi | |
| 2017/0015416 A1 | 1/2017 | O'Connor et al. | |
| 2017/0223947 A1 | 8/2017 | Gall et al. | |

OTHER PUBLICATIONS

CA Office Action in CA Application No. 3,144,779, dated Feb. 27, 2023, 6 pages.

International Search Report and Written Opinion in International Application No. PCT/US2020/038437, dated Sep. 3, 2020, 13 pages.

Canada Examination Report in Canada Application No. 3144779 dated Dec. 28, 2024, 5 pages.

* cited by examiner

CROP INPUT APPLICATION SYSTEMS, METHODS, AND APPARATUS

BACKGROUND

Applicators such as irrigation systems, sprayers, sidedress bars, etc., are used to apply one or more crop inputs; some embodiments are used to apply one or more crop inputs to a standing crop.

SUMMARY

In one embodiment, a crop input application system is disclosed. The crop input application system includes an irrigation vehicle with a transversely extending boom, a plurality of wheel assemblies and a plurality of applicators. The plurality of wheel assemblies at least partially support the boom. A supply vehicle is configured to be connected to the irrigation vehicle such that the supply vehicle and irrigation vehicle move together in tandem.

In another embodiment, a reel is supported at a height above a soil surface and defines a rotational axis extending in a direction transverse to the crop rows. The reel is positioned between first and second adjacently spaced crop rows and further defines a width along the rotational axis less than a distance between said first and second adjacent crop rows.

In another embodiment, a method of applying crop input is disclosed. In one step, a crop applicator includes a reel and traverses a field portion with the reel positioned between adjacent crop rows.

The scope of the present disclosure is defined solely by the appended claims and is not affected by the statements within this summary.

DESCRIPTION

Figure 1:
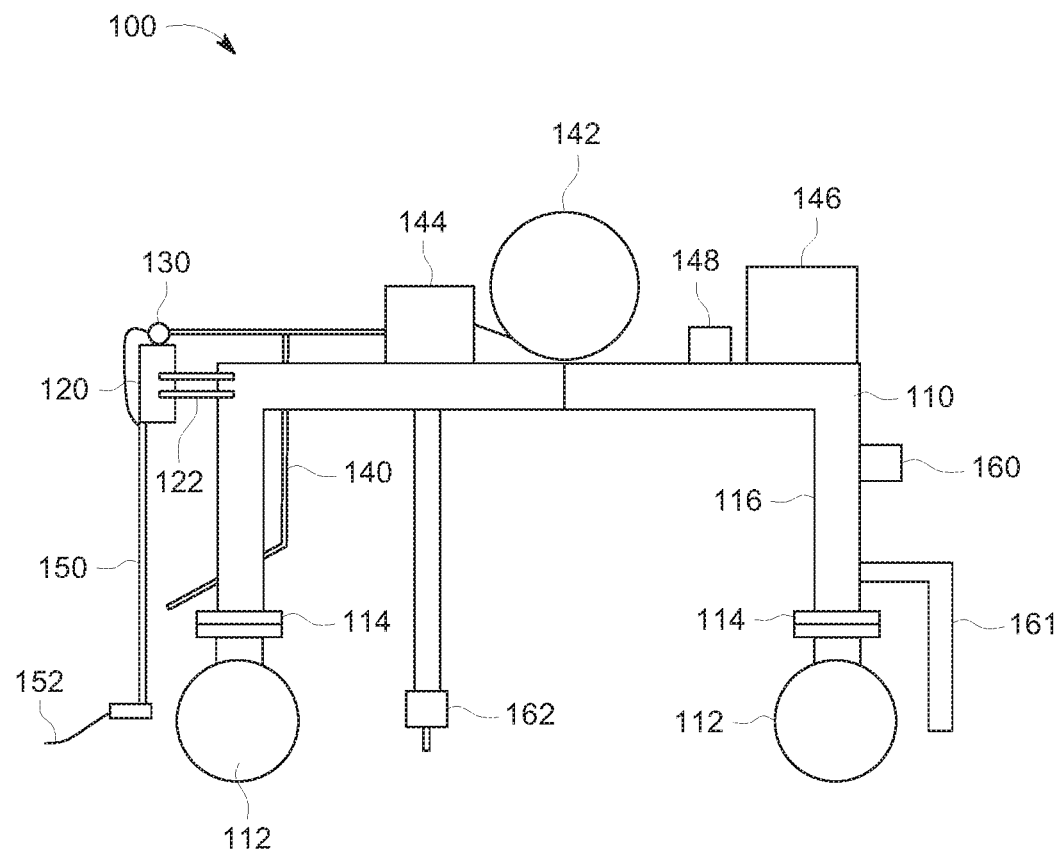
FIG. 1 is a schematic side view of one example of a crop input applicator vehicle.

It will be appreciated that different embodiments employing one or more features of crop input applicator vehicles are described herein. Features discussed with respect to one embodiment can be applied to other embodiments as desired. Referring now to the drawing figures wherein like reference numerals designate the same or corresponding components throughout the several figures, FIG. 1 illustrates one embodiment of a crop input applicator vehicle 100. The vehicle 100 includes a frame 110 supported on one or more wheel assemblies 112 that are steerable with respect to the frame 110 to navigate the vehicle 100 through a field of crops (e.g., a row crop). Wheel assemblies 112 can be coupled to frame 110 through bearings 114 that allow rotation of the wheels 112 with respect to the frame 110 to enable vehicle 100 to change direction and propel throughout the field. For example, one or more support legs 116 is/are optionally supported on a wheel assembly 112. Each wheel assembly 112 is optionally pivotally coupled to a respective support leg 116, e.g., for pivoting about a vertical axis through bearing 114. In some embodiments, an actuator is configured to steer the wheel assembly 112, e.g., to pivot a wheel portion relative to the support leg 116. In some embodiments, the wheel assembly 112 is driven for rotation by a motor 960 such as an electric motor, which motor may be operably coupled to the wheel assemblies 112.

Extending from a rearward portion of the frame 110 is a boom 120 mounted on an adjustable linkage 122. In one embodiment, the adjustable linkage 122 is operable to adjust a height of the boom 120 relative to ground while the vehicle 100 travels through the field of crops. According to various embodiments, the boom 120 can be of any number of different lengths and of any number of different configurations. For example, common boom 120 lengths include 60 feet, 90 feet, and 100 feet. Any other boom 120 length could be employed, as well, in accordance with different embodiments. The boom 120 is attached to the frame 110 using any number of attachment technologies including, for example, a z-bracket mechanism. In different embodiments, the boom 120 can be attached in front of frame 110 or behind the frame 110. When using adjustable linkage 122, the ability to raise the boom 110 to a height that is high enough to allow the vehicle 100 to turn on the end of a field in a standing crop without injuring the standing crop. In other embodiments, portions of the boom 120 can be folded upwardly, and out of the way of the standing crops.

Figure 2:
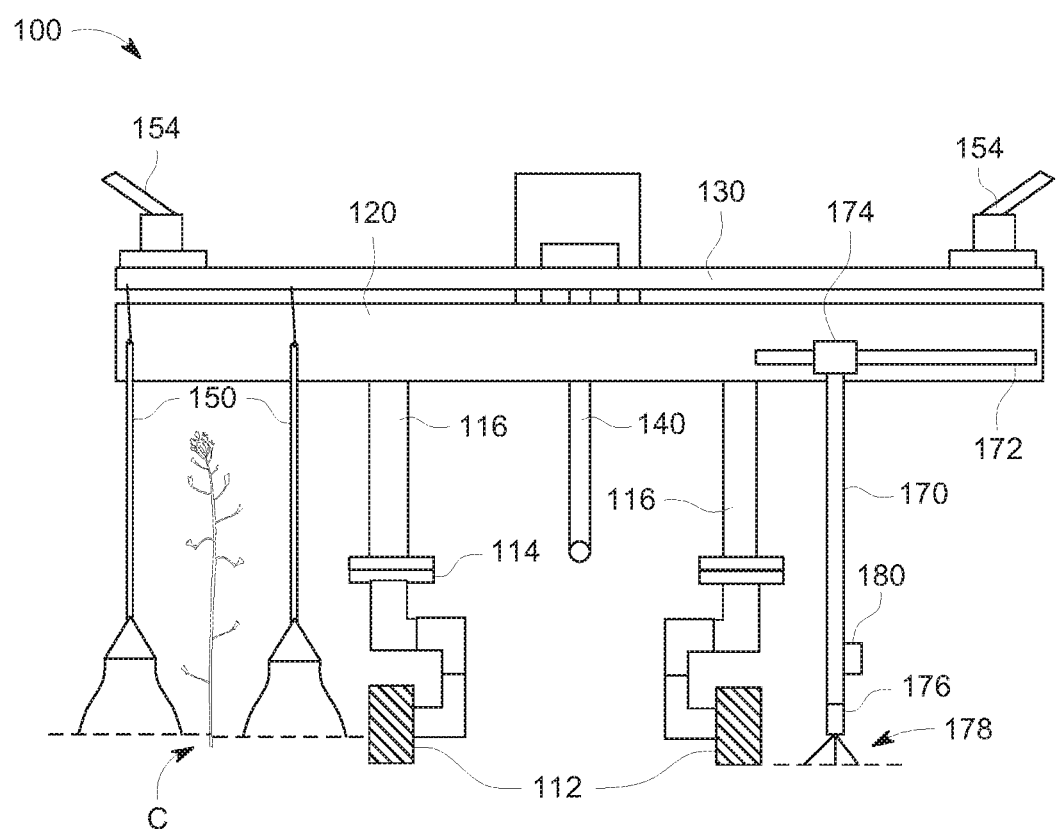
FIG. 2 is a schematic rear view of the crop input applicator vehicle of FIG. 1.

In some embodiments and with further reference to FIG. 2, the vehicle 100 may include one drop assembly 150 optionally positioned for every crop row C (e.g., every 30 inches in 30 inch rows). In some embodiments, the total number of drop assemblies 150 is between 40 and 100. In some embodiments, a 120-foot applicator 100 has forty-eight drop assemblies 150 or approximately forty-eight drop assemblies 150. In some embodiments, a 240-foot applicator has ninety-six drop assemblies 150 or approximately ninety-six drop assemblies 150. In addition to drop assemblies 150, vehicle 100 may support one or more water guns 154 fluidly coupled to the conduit 130 and positioned to supply water and/or nutrients away from the vehicle 100 to areas not directly accessible to the drop assemblies 150.

The boom 120 optionally supports a conduit 130 extending generally transversely across the vehicle 100. The boom 120 further supports a plurality of applicators which may comprise transversely spaced drop assemblies 150 fluidly coupled with one or more outlets 152 (e.g., dribble hoses). Each drop assembly 150 optionally includes a conduit (e.g., flexible conduit) in fluid communication with the conduit 130 and in fluid communication with the outlet 152. In some embodiments, the outlet 152 is relatively restrictive (e.g., more restrictive than one or more outlets provided in the conduit 130). One or more pumps and/or valves of the vehicle 100 optionally control the flow rate of fluid (e.g., water) exiting a single outlet 152 and/or a plurality of outlets 152. One or more flow sensors of the vehicle 100 optionally measure the flow rate of fluid (e.g., water) exiting a single outlet 152 and/or a plurality of outlets 152. In some embodiments, one or more of the drop assemblies 150 include common structure and/or features with one or more embodiments disclosed in U.S. Pat. No. 9,167,745, hereby incorporated by reference herein in its entirety. The outlets 152 optionally comprise outlets of flexible conduits supported on the drop assembly 150.

In one embodiment, the outlets 152 are dribble hoses mounted to a respective drop assembly and biased outward to apply liquid (e.g., water, nutrients mixed with water) at the base of a row of crops. The conduit 130 is fluidly connected with a fluid inlet 140, which is connectable to a water source (e.g., well head, reservoir). Optionally, in one embodiment, vehicle frame 110 carries a secondary crop input container 142 and an injection pump 144 to supply nutrients or other products into conduit 130 along with water from inlet 140. The tank 142 may be fluidly coupled to the boom 120 or to one or more separate outlets for applying a secondary crop input (e.g., fertilizer, insecticide, herbicide, biological, etc.) to a field. The pump 144 may be associated with the secondary crop input container 142 and used to move secondary crop input to control the flow rate of the secondary input.

A power unit 146 and master controller 148 can be carried by frame 110 to provide power to one or more power-consuming devices (e.g., motors, pumps, processors) of vehicle 100. In one embodiment, the power unit 146 is a diesel generator. In other embodiments, the power unit is another power source. Master controller 148 is connected to various components on vehicle 100 to provide control of the vehicle (e.g., application of liquid through drop assemblies 150, navigation of vehicle 100).

For example, master controller 148 can be operatively coupled with various sensors and controls to operate vehicle 100. In one embodiment, a steering sensor 160 measures a position of the vehicle 100 in the crop row and calculates a cross track error which is then corrected by a steering algorithm in the master controller 148. In addition, in some embodiments, one or more crop sensors 161 are coupled to the frame 120, e.g., to a generally lower end of the frame or in other positions as desired. In addition to crop sensors 161 as illustrated, other crop sensors may be coupled to various positions on the vehicle 100, for example any number of the drop assemblies 150 including none of the drop assemblies 150, all of the drop assemblies 150, and anywhere between none and all of the drop assemblies 150. Crop sensors 161 may include cameras, Normalized Difference Vegetation Index (NDVI) sensors, radar, LIDAR, thermal sensors, ultrasonic sensors, infrared sensors, or other sensing technologies and are used to measures crop health. In one embodiment, a sensor is used to detect wilting of the crop or rolling of the leaves to increase the water applied to those plants. In addition to crop sensors 161, vehicle 100 can include one or more soil sensors 162 that probe the soil to collect samples to measure the current water supply, total water holding capacity of the soil and/or other characteristics of the soil as desired.

In some embodiments, one or more sensors 160-162 are optionally configured to measure one or more soil-related criteria (e.g., soil moisture, soil temperature, soil reflectivity, soil color, soil electrical conductivity, soil organic matter, soil cation exchange capacity, etc.). In some embodiments, one or more sensors 160-162 comprise a remote sensor that does not contact the soil but is optionally oriented toward the soil. In some embodiments, one or more sensors 160-162 comprise a contact sensor that engages the surface and/or subsurface of the soil.

In some embodiments, one or more sensors 160-162 are optionally configured to measure one or more crop-related criteria (e.g., crop color, crop reflectivity, stalk diameter, crop presence, crop population, crop spacing, crop uniformity, etc.). In some embodiments, one or more sensors 160-162 comprise a remote sensor that does not contact the crop but is optionally oriented toward the crop (e.g., transverse to a travel direction of vehicle 100). In some embodiments, one or more sensors 160-162 comprise a contact sensor that contacts the crop (e.g., a stem, leaf, etc.) Data from all of the sensors 160-162 can be stored by the master controller 146 and sent through a data connection to a cloud server for analysis and storage.

Boom 120 can also support a weed drop assembly 170, which is connected with a linear track or rail 172 on the boom 120. Weed drop assembly 170 is configured to remove weeds from the field. In one embodiment, weed drop assembly is supported on (e.g., mounted to) the boom 120 through a driven head 174 on a linear track 172 supported by the boom 120 to position the weed drop assembly 170 laterally along the width of the boom 120 to align with weeds.

As illustrated in FIG. 2, a rotating head 176 may be mounted to the bottom of the weed drop assembly 170 and positioned to engage the ground during operation of the vehicle 100. The head 176 may be driven from a drive wheel connected to the weed drop assembly 170 and positioned on the ground and powered by the movement of the vehicle 100 or it may be driven by an electric motor or other rotation actuator provided by the vehicle 100. A weed implement 178 can be mounted to the head 176 and configured to remove weeds from the field. In one embodiment, implement 178 can include fingers, blades, plastic or metal wire, lasers, hot air guns, electric shock probes, or other soil or weeding features. In an alternative embodiment, weed drop assembly 170 can include a stationary head equipped with a blade and weeding occur by positioning the drop assembly 170 laterally along the boom 120 (via rail 172) to pass through a weed as the vehicle 100 moves forward.

Weed drop assembly 170 may further include one or more sensors (e.g., sensor 180) detect the presence of crop plants and weeds during operation of vehicle 100 and control the position of the weed drop assembly 170 or rotating head 176 to remove weeds while avoiding healthy crops. An operator of vehicle 100 may be enabled to designate weaker crop plants to be removed. For example, weaker plants are sometimes called late emergers. Master controller 148 may utilize data from sensors 160-162 and sensor 180 to compare size, biomass, stalk diameter or other features of the crops detected by the sensors during operation of the vehicle 100. Crop plants that differ from the average by an amount larger than a threshold set by an operator may be considered weeds and removed by the control system with the weed drop assembly 170. Plants may also be considered for removal if they fail to grow at an average rate as calculated by the master controller 148 as the change in size, biomass, stalk diameter, or other features of plants from a historical measurement taken during a previous application pass and the current measurement.

Figure 3:
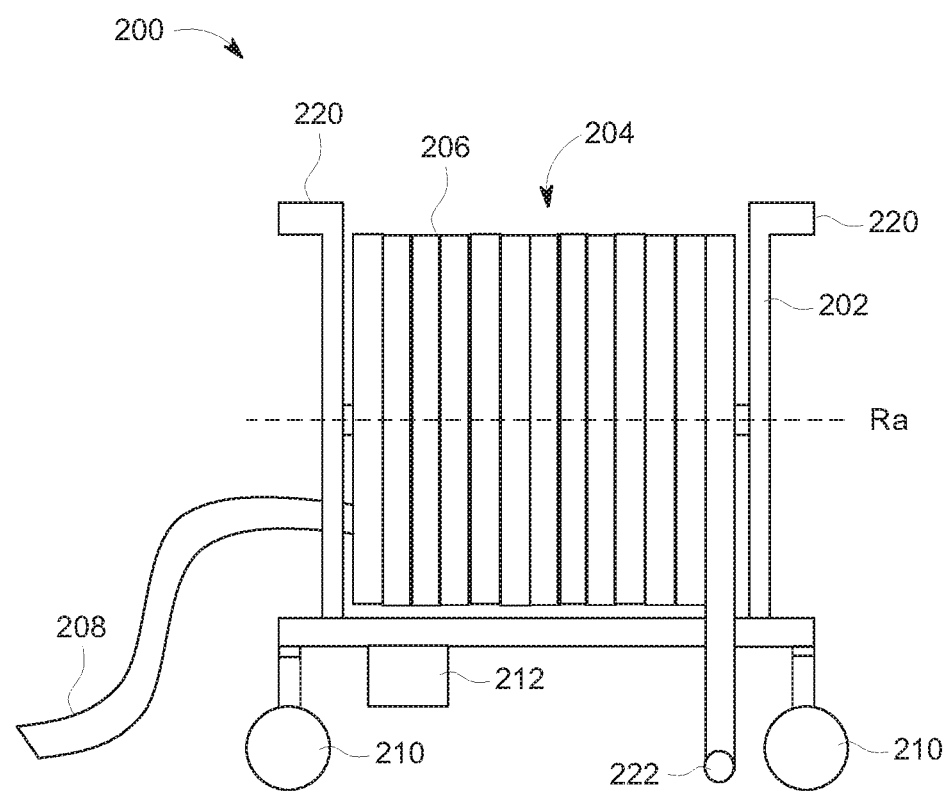
FIG. 3 is a schematic view of a supply vehicle.

As illustrated in FIG. 3, a supply vehicle 200 can be used with vehicle 100 to provide water to fluid inlet 140. Vehicle 200 includes a frame 202 supporting a reel 204 carrying a flexible conduit 206 (e.g., a hose) for rotation about an axis Ra. Liquid is supplied to the flexible conduit 206 through a drag hose 208. Steerable wheels 210 are used to allow the supply vehicle 200 to be moved in any direction. A power source 212 may be a diesel generator or a battery that is charged by the irrigation vehicle 100 when it is connected to the supply vehicle 200. Vehicle latch points 220 are used to the connect the irrigation vehicle 100 to the supply vehicle 200 to move it to a new position in the field. In another embodiment, the supply vehicle 200 is self-driven and moves to a desired position in the field in conjunction with the irrigation vehicle 100 to maintain the safety of the hose and to align itself to dispense hose to the irrigation vehicle as it travels through a pass. A pressure booster pump (not shown) may be used on the supply vehicle 200 and powered by the power source 212 to boost the pressure of the liquid and allow for more flow to be produced over a longer distance.

In some embodiments, the reel 204 may be self-winding (e.g., torsionally spring-biased) and/or feature one or more winding mechanism and/or a shuttle or other mechanism for guiding the conduit 206 into position. The conduit 206 optionally has an outlet end 222 in fluid communication with fluid inlet 140 on vehicle 100. The conduit 132 optionally has an inlet end which may be displaced to a location remote from the vehicle 200 (e.g., by unwinding reel 204) and which is optionally configured to be in fluid communication with a primary crop input source (e.g., water source such as a wellhead outlet or other outlet).

In various embodiments, the device or devices used to store conduit 206 may take on various forms. For example, a plurality of reels may be disposed along a width of vehicle 200 and may be fluidly coupled (e.g., selectively fluidly coupled) to one another. The conduit 206 optionally at least partially comprises hard (e.g., non-flattening) flexible tubing. Also or alternatively, the conduit 206 optionally at least partially comprises flat tubing which may become generally flat when the tubing is not filled with water and expand when the tubing is filled with water. In some embodiments, during operation the conduit 206 includes a filled portion supported on the vehicle 200 and a non-filled (e.g., empty) portion supported on the vehicle 200.

Figure 4:
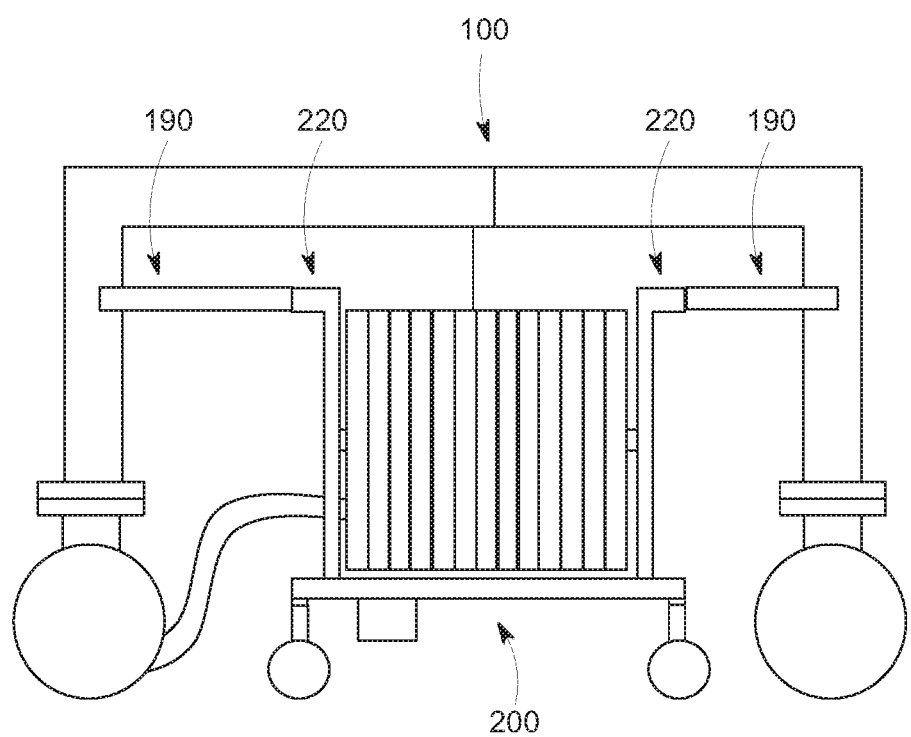
FIG. 4 is a schematic view of a supply vehicle connected with a crop input applicator vehicle.

As illustrated in FIG. 4, supply vehicle 200 can be nested within and connected to irrigation vehicle 100. Latch points 220 of supply vehicle 200 can be connected with corresponding latch points 190 on irrigation vehicle 100. Once supply vehicle 200 is connected to irrigation vehicle 100, irrigation vehicle 100 can then be navigated to a desired location. For example, in one embodiment, the connected irrigation vehicle 100 and supply vehicle 200 travel to a first row of crops. After reaching the first row of crops, the irrigation vehicle 100 is disconnected from the supply vehicle 200 and proceeds to traverse between a first and second row of adjacent crops, providing irrigation to proximate rows and dispensing the irrigation hose between the first and second rows. After reaching the end of the field, the irrigation vehicle 100 can reverse and return to the supply vehicle 200. Upon return to the supply vehicle 200, the irrigation vehicle 100 and supply vehicle 200 can be connected and subsequently move to between a third and fourth row of crops.

Figure 5:
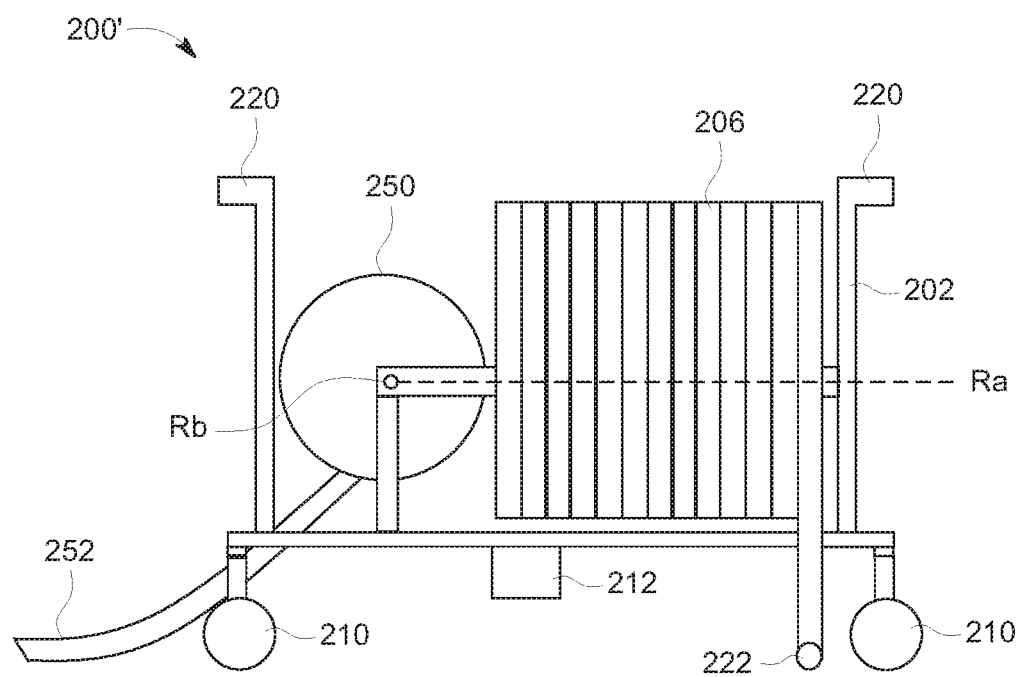
FIG. 5 is a schematic side view of an alternative supply vehicle.

In another embodiment of a supply vehicle 200' illustrated in FIG. 5, a supply reel 250 rotationally supports a supply conduit or hose 252 for rotation about a rotational axis Rb. Supply conduit 252 is fluidly coupled with conduit 206, which delivers fluid to outlet 222. In one embodiment, conduit 252 has a different diameter than conduit 206. In one example, supply reel conduit 252 has a larger diameter, reducing pressure drop from the water source to conduit 206. When irrigation vehicle 100 and supply vehicle 200' are connected and moving in tandem to a desired row for irrigation, the supply reel 250 is rotated to either extend or retract the supply hose 252 at a speed matching the speed of the tandem. The supply conduit 252 may be rotatably attached to the water supply to follow the supply vehicle 200' as it is moved from one half of the field to the other. In a further embodiment of the supply vehicle 200' as discussed below, the reel 202 is carried on the irrigation vehicle 100 and connected to the supply conduit 252 which is carried on the supply vehicle 200'.

Figure 6:
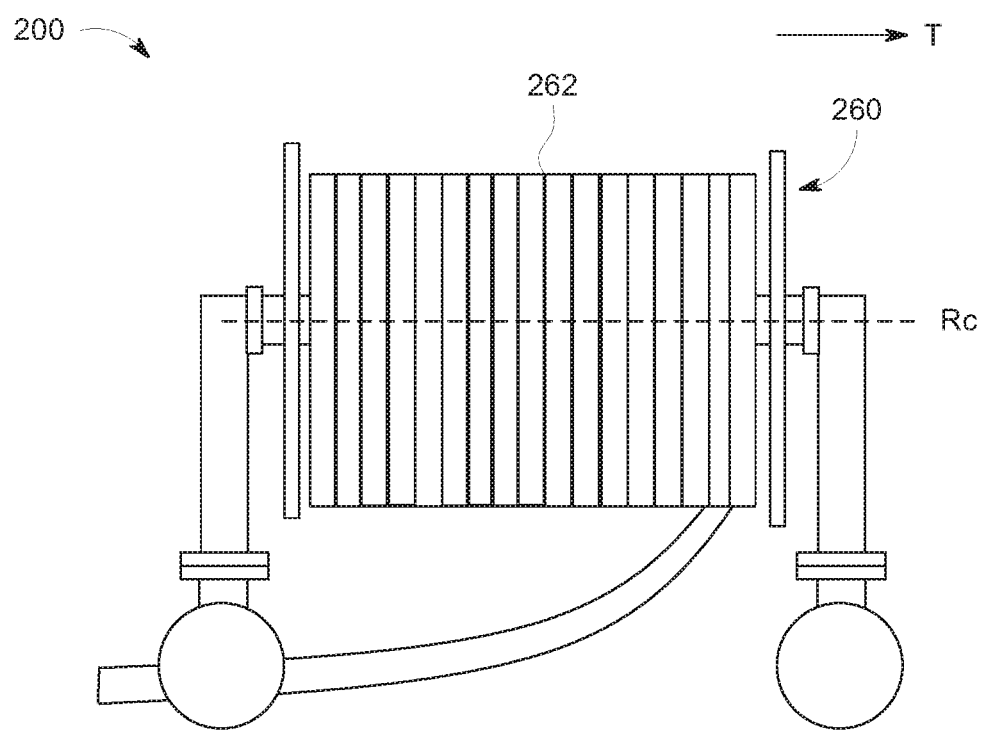
FIG. 6 is a schematic side view of an alternative supply vehicle.

In yet another embodiment of a supply vehicle 200″ illustrated in FIG. 6, a reel 260 rotationally supports a hose 262 about a rotational axis Rc that extends in a direction of travel T for the vehicle 200″.

Figure 7:
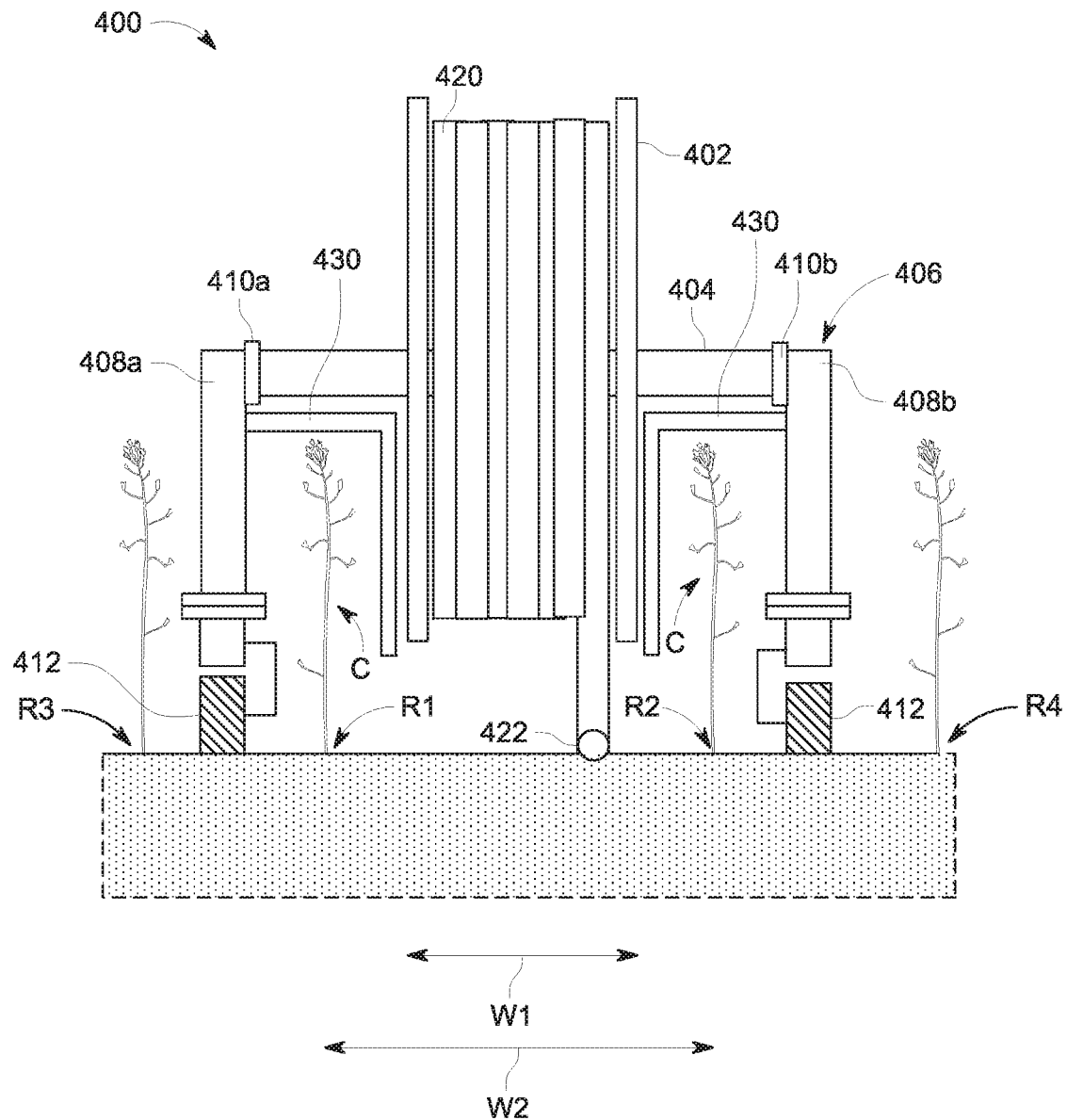
FIG. 7 is a schematic rear view of an alternative crop input applicator vehicle.
Figure 8:
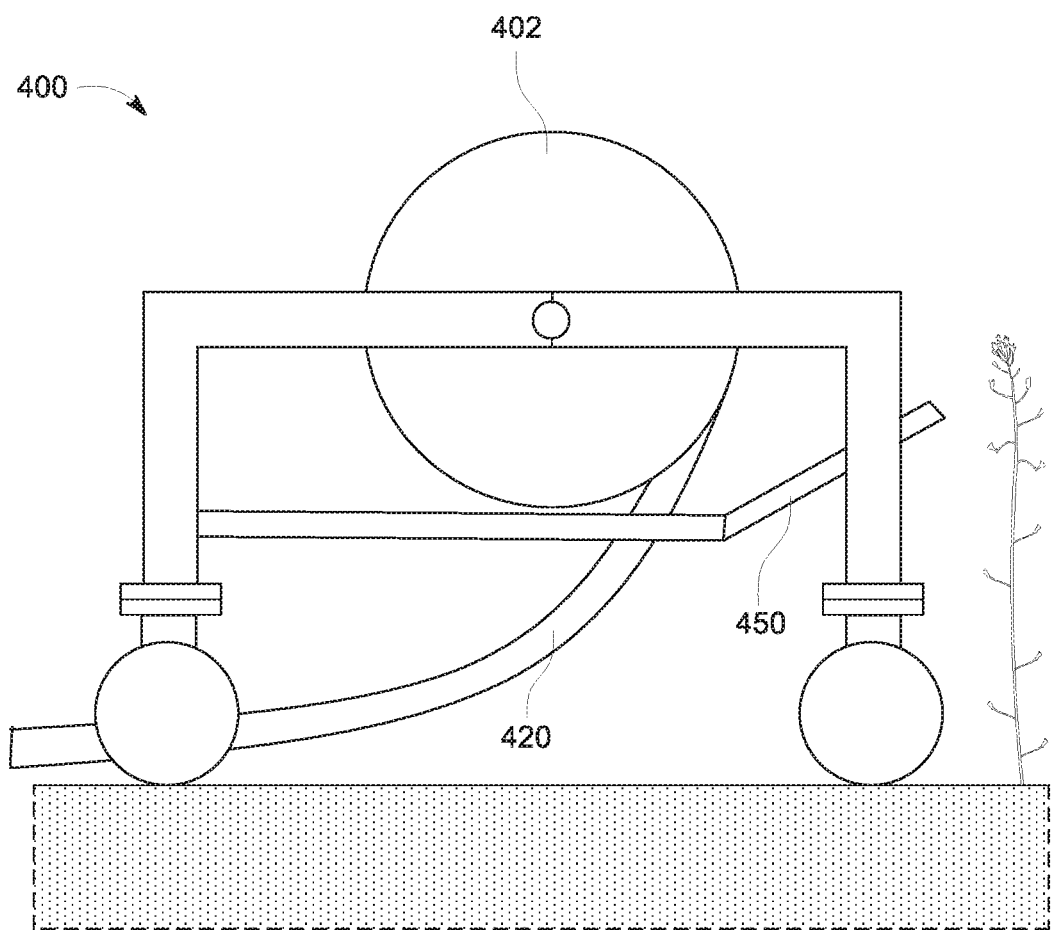
FIG. 8 is a schematic side view of the crop input applicator vehicle of FIG. 7.

Another embodiment of a crop input applicator vehicle 400 is illustrated in FIGS. 7 and 8, wherein a reel 402 is rotationally supported on a central shaft 404. Vehicle 400 can include any of the features discussed above with respect to vehicle 100 and used in conjunction with supply vehicle 200 or another liquid supply source as desired. Shaft 404 connects with a vehicle frame 406, which includes spaced apart supports 408a and 408b. In one embodiment, shaft 404 is supported on frame 406 through bearings 410a and 410b, respectively. Bearings 410a, 410b can take many forms, such as pillow block bearings, slewing bearings or others. Shaft 404 can be supported at a height taller than crops C positioned within a field. Additionally, vehicle frame 406 can be alternatively or additionally mounted on an adjustable carriage to allow its height to be raised and lowered for different height crops. Frame 406 is supported on a plurality of wheel assemblies 412, which can be driven and/or steered to move vehicle 400 as desired. While reel 402 is illustrated as rotating about shaft 404 that is orthogonal to a direction of travel for vehicle 400, shaft 404 can be positioned to be parallel with a direction of travel for vehicle 400. Additionally, a direction of wheel assemblies 412 can change to orient the direction of shaft 400 to be parallel to, orthogonal to or oblique to a direction of travel for the vehicle 400.

As shown in FIG. 7, the reel 402 can be positioned in a field to rotate between rows of crops R1 and R2. Although illustrated as centrally positioned between supports 408a and 408b, reel 402 may also be mounted off center between supports 408a and 408b. A width W1 of the reel may be equal to or less than a spacing width W2 between the rows R1 and R2 of crop. In one embodiment, width W2 is approximately 30 inches, wherein width W1 is less than 30 inches (e.g., 29 inches, less than 29 inches, between 29 and 25 inches, 25 inches, less than 25 inches). A position of reel 402 with respect to supports 408a and 408b can further be selected to position wheel assemblies 412 between rows of crops. For example, support 408a is positioned between rows R1 and R3, whereas support 408b is positioned between rows R2 and R4.

A flexible conduit (e.g., a hose) 420 carried by the reel 402 is optionally connected to a liquid source through an inlet 422. Water may be supplied to the conduit 420. Additionally, fertilizers and/or chemicals may be supplied. At times, fertilizer is optionally injected into the water flow to provide a controlled mixture of fertilizer and water to a field of plants. Water may be sourced from a ground water well, or pressurized by a pump sourcing water from a stream or river, a standing body of water, or a tank. Manure may also be supplied through the conduit 420 to be applied to the field or mixed at a controlled rate into a flow of another liquid passing through the conduit 420.

In a further embodiment, side shields 430 can be mounted to vehicle frame 406 and positioned along sides of the reel 402 to protect crops as vehicle 400 passes through the crops. In one embodiment, a front and/or rear ends of the shields can be tapered to engage crop and gently push crop to the side. In a further embodiment illustrated in FIG. 8, a belly shield 450 can be positioned under reel 402 to gently bend crop downward such that the crop is prevented from being damaged as the crop passes under reel 402. To accommodate conduit 420, shield 450 can include a slot or hole therein to allow the conduit 420 to pass through the shield 450 to the ground.

Figure 9:
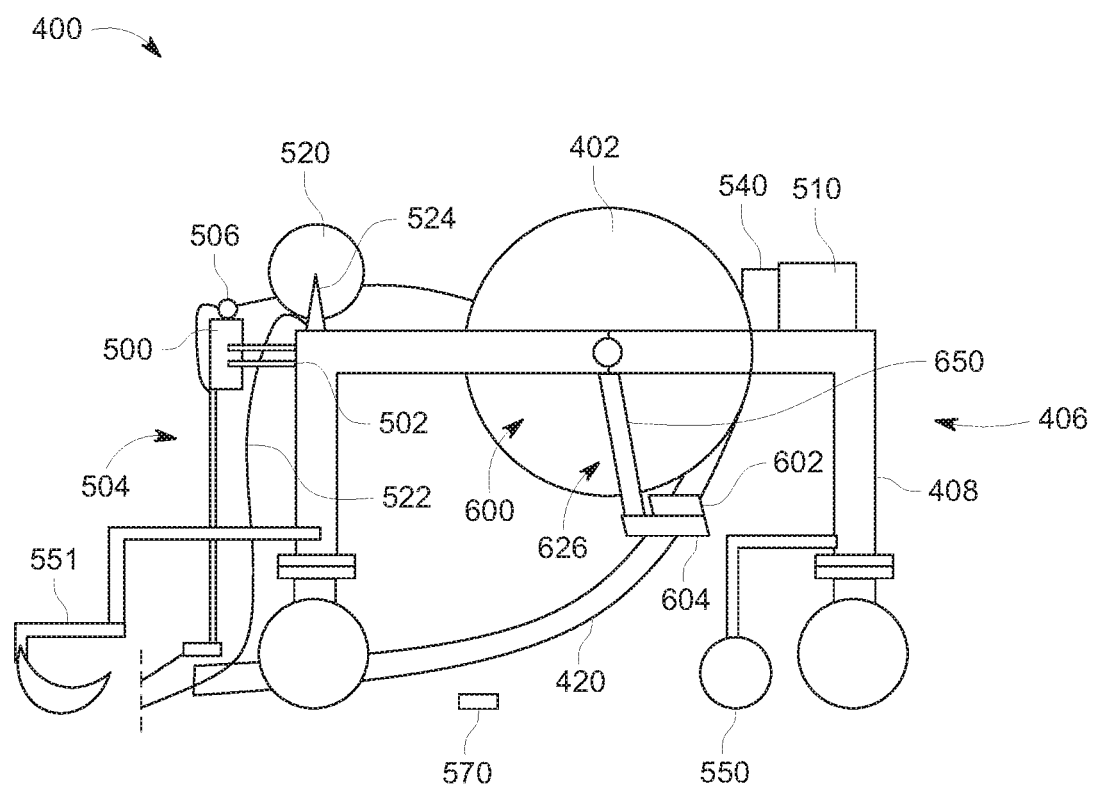
FIG. 9 is a schematic side view of an alternative crop input applicator vehicle.

As illustrated in FIG. 9, vehicle 400 can have various features similar to vehicle 100 as well as other features as desired. For example, vehicle 400 includes a boom 500 supported by an adjustable linkage 502. The boom 500 supports one or more drop assemblies 504 fluidly coupled to a conduit 506, which in turn is fluidly coupled with conduit 420. Vehicle 400 can be powered in various ways, for example by a generator 510 supported on the frame 406. Vehicle 400 may also be powered by other sources such as solar cells or batteries that are replaced when empty or charged when the vehicle 400 docks in a charging station.

In another embodiment, the vehicle 400 is powered through a wire. In this embodiment, vehicle 400 can support a power cord reel 520 that carries a power cord 522 connected to a remote power source. In one embodiment, power cord 522 can include one or more wires for example three wires to provide three phase power. The wires may be bonded together in one cord or remain independent. The power cord 522 can be stored on power cord reel 520 and dispensed at a speed matching a ground speed of the vehicle 400. Power cord reel 520 can be equipped with a controller 524 that controls dispensing and retracting power cord 522 relative to reel 520. In an alternative embodiment, vehicle 400 is powered with single phase power.

Figure 16:
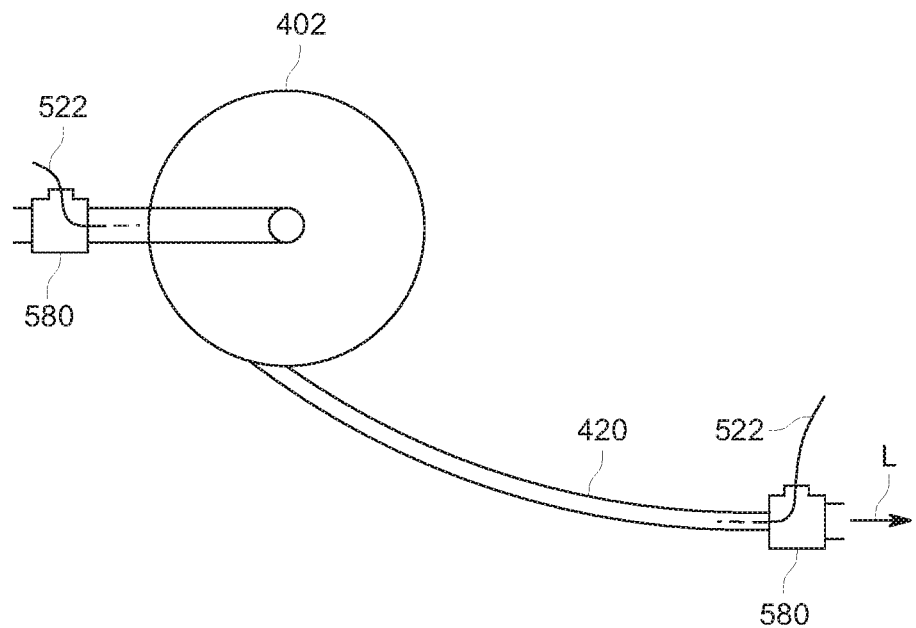
FIG. 16 is a schematic side view of connection between a power cord and a conduit.
Figure 17:
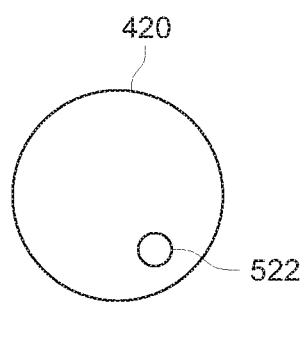
FIGS. 17-19 are schematic sectional views of a power cord positioned with respect to a conduit.
Figure 18:
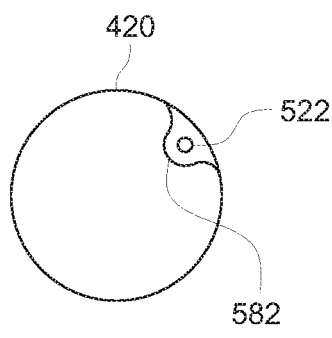
Figure 19:
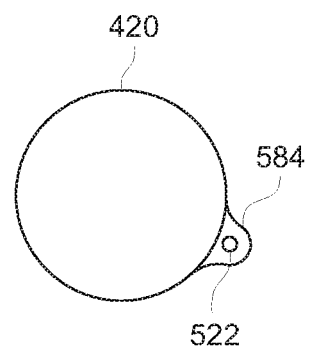

With reference to FIG. 16, in one embodiment, power cord 522 is routed inside or directly connected with the conduit 420 and passes out each end of the conduit 420. As illustrated in FIG. 16, at one end 522A, the power cord 522 provides power to the vehicle 400 and at the opposite end 522B the power cord is connected to a power source. T-fittings 580 may be used at each end of the hose to provide a sealed point for the cord 522 to enter and exit while liquid passes straight through the T-fittings 580 within conduit 420. As illustrated in FIGS. 17-19, the power cord 522 can freely float in liquid as it passes through the conduit 420 (FIG. 17) or the cord 522 may be molded or bonded to an internal surface 582 (FIG. 18) or to an external surface 584 (FIG. 19) of a wall 586 of the conduit 420.

Vehicle 400 can further support a controller 540 to operate vehicle 400, apply liquid through drop assemblies 504 and monitor crop, soil and other environmental conditions. To that end, vehicle 400 includes various sensors, such as sensors 550 and 551. As illustrated, sensor 550 includes a ground penetrating member such as a rolling disk, whereas sensor 551 includes a sliding blade which may be mounted to the vehicle 400 through a stationary or pivotable mount and penetrate the soil while taking measurements as the vehicle 400 moves. In one example, a capacitive sensor or other moisture sensor may be used as the environmental sensor 550 to measure the moisture of the soil. Multiple sensors may be mounted on the ground penetrating member at different positions to collect data from different depths in the soil. The rate of water, fertilizer or chemical applied by the vehicle 400 may be adjusted based on the detected measurement(s) relative to a target set by the operator.

In the illustrated embodiment, sensor 550 is positioned to detect soil moisture mounted in front of vehicle 400 and sensor 551 is mounted behind drop assembly 504 on the vehicle 400. In one example operation of vehicle 400, the rate of liquid applied to a subsequent area of soil can be adjusted by controller 540 based on the dryness of that soil detected by sensor 550 and the wetness of the soil detected by sensor 551 after the drop assembly has applied a known amount of water to the previous area. For example, the sensor 550 may detect that the area in front of the vehicle 400 is dryer than a previous area that took a certain amount to be detected as full by the sensor 551. Controller 540 can accordingly adjust the target rate of liquid application as it enters the new area to apply a larger amount of water or actively adjust until the sensor 551 reports that the soil is full of liquid (or above a particular threshold). Other sensors may be spaced at different locations along boom 500 and the control system may adjust a common rate along the boom to best apply liquid to match the variation in soil detected by the sensors 550 and 551, or to fill the driest soil detected to a desired level, or to an operator target, or to not overfill any particular soil under the boom 500 by limiting application to an operator target. Controller 540 can store historical data collected by sensors 550 and 551 from previous passes through the field in memory or in a data cloud accessed through a wireless connection.

As the vehicle 400 applies a liquid to a crop area, the controller 540 can compare current measurements taken by sensors 550 and 551 with historical data collected by those same sensors and adjust a rate of liquid applied by drop assemblies 504 until a result is achieved equal to past applications. For example, controller 540 can determine based on a moisture sensor measurement that an area of soil is 10 percent full compared to a historical measurement for that soil prior to a previous application and a historical record of how much applied water it took to fill the soil in that area to one hundred percent full or to an operator threshold fullness target.

In addition to sensors 550 and 551, controller 540 can collect data from stationary sensors 570 positioned in a field such as moisture probes, nutrient probes, rain gauges, weather stations, crop sensors, cameras, or other relevant sensors by positioning the vehicle 400 within a necessary distance to wirelessly connect to the sensor through a communication method such as Bluetooth. Data may be transferred while the vehicle 400 is parked or while it passes over or near the sensor 570 at a rate of speed necessary to allow sufficient time for data transfer to be completed. Data could also be transferred to the vehicle through docking to a data connection positioned on the stationary sensor 570 in a location accessible to the vehicle. Data collected by sensors 570 in the field or on the vehicle 400 (e.g., sensors 550 and 551) can be transferred to a storage location such as a data cloud through a wireless method or by docking with a data transfer station in the field. The data transfer station can be connected through a wire to an internet source or through a higher speed transfer method than available on the vehicle 400.

As will be discussed in more detail below, using controller 540, an operator positioned remote from vehicle 400 can be enabled to view, download, or interact with the data through an operator station and make application decisions to change the rate or create a new prescription plan for the current or a future application pass that is transferred back to the vehicle 400. The operator may also be enabled to select a location in the field to park vehicle 400 between passes or the controller 540 can recommend a location to the operator or decide on a location based on sensor measurements from the last application pass or from historical passes. For example, the controller 540 can determine a soil area with low moisture capacity in the field by comparing historical measurements collected in that area during previous application passes to other areas in the field. When vehicle 400 is parked, the mobile soil sensors may continue to collect data over time and report that data to the controller 140. As the crop uses an input such as water, sensors will report a reduced amount of that input that is still available in the soil. Natural events like rainfall or application by the vehicle 400 will raise the quantity of that input for that location. As the crop uses the input, the controller 540 may alert the operator when levels fall below a threshold as determined by the operator or by the controller 540 based on historical data collected from sensors detecting a decrease of crop health as the level of measured input has fallen below the threshold in that area. The controller 540 can detect the location of plants using plant sensors such as cameras, ultrasonic distance sensors, radar, contact feelers, or other plant sensors. The controller 540 can adjust the final parked position of the vehicle 400 to align its sensors in a row of plants, in the middle of a pair of rows or in a target location relative to the plants as set by the operator.

Sensors 550-551 mounted to the vehicle 400 can further detect the need for water, fertilizer, or an agricultural chemical where the vehicle is located and send measurements to the controller 540 which optionally actively adjusts a rate of liquid applied until the sensors 550-551 report the need is satisfied. In one embodiment, sensors 550-551 include thermal sensors or thermal cameras to detect an original temperature of the soil and the presence of water being applied to actively adjust the rate of liquid applied. The liquid dispensed from assembly 504 is optionally at a different temperature than the soil surface. As liquid is applied in a stream at the base of rows of plants, the camera or sensor 550-551 detects change in temperature between dry soil and wet soil, which directly shows where liquid has been applied. The liquid will infiltrate down into the soil before spreading out to a center of the row. By detecting spreading liquid as a changing temperature at the soil surface, the thermal camera or sensor provides an indicator that the soil is sufficiently full when water has reached the center of the row and started to cool that soil. An operator is optionally enabled to choose to limit the application of liquid to only cover a percentage of the area between rows. The controller 540 optionally waits for an indication from the thermal sensor or camera that the liquid has reached the operator threshold and moves the vehicle 400 to the next area.

Figure 10:
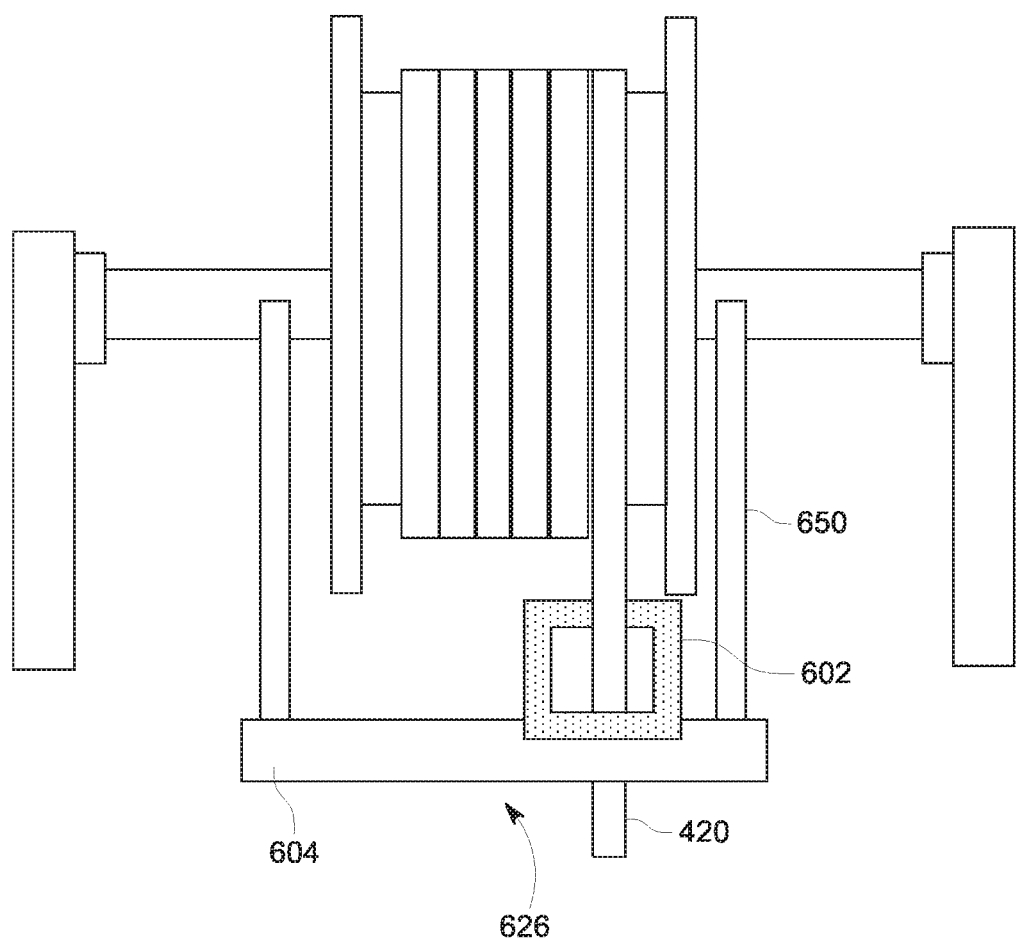
FIG. 10 is a schematic front view of a portion of the alternative crop input applicator vehicle of FIG. 9.

In addition to features identified above, vehicle 400 can include a conduit control assembly 600 configured with one or more features to control dispensing and retraction of conduit 420 with respect to reel 402. In one embodiment, the control assembly 600 can include a moving carriage or traverser 602 that engages conduit 420 as the conduit 420 is dispensed or retracted with respect to reel 402. As illustrated in FIG. 10, the moving carriage 602 is optionally moved along a linear track 604 to position the conduit 602 as it enters or leaves the reel so that each wrap of the conduit 420 on the reel 402 is held tightly next to the previous wrap. The vehicle 400 optionally dispenses the conduit 420 at a rate selected to match the ground speed of the vehicle 400.

Figure 11A:
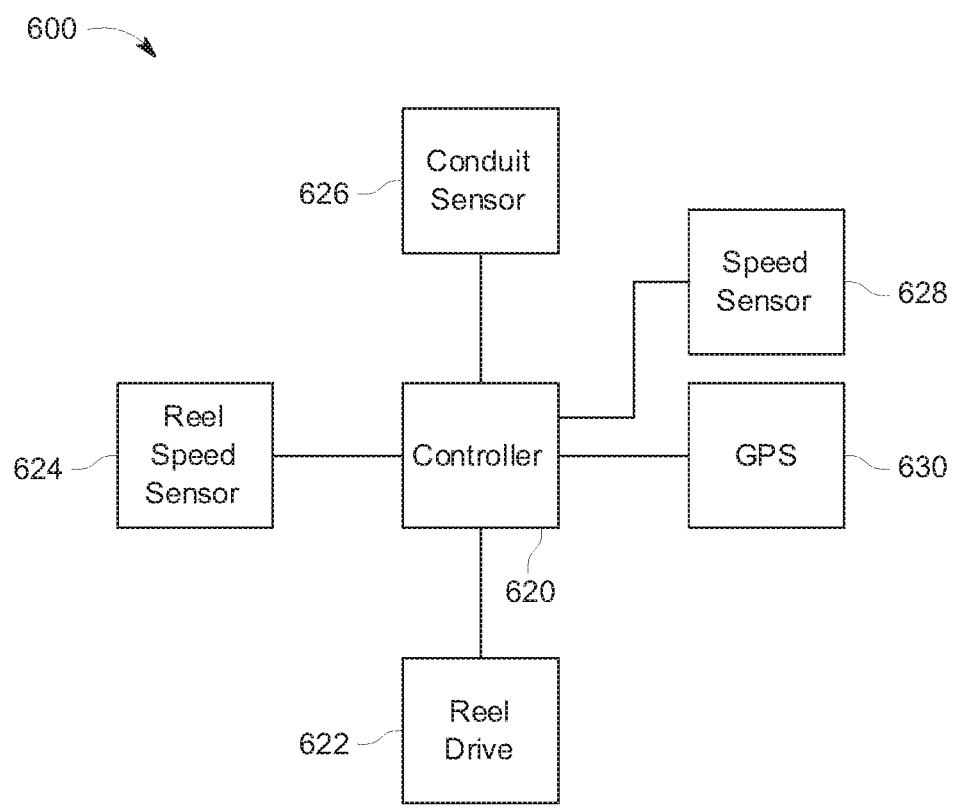
FIG. 11A is a schematic block diagram of a control assembly.

Additionally, control assembly 600 can maintain a controlled amount of tension or sag in the conduit 420 as described in further detail herein. With additional reference to FIG. 11A, control assembly 600 includes a controller 620, a reel drive 622, a reel speed sensor 624, a conduit sensor 626, a vehicle speed sensor 628 and a global positioning system (GPS) 630. Reel drive 622 can be any type of drive mechanism to control rotation of reel 402 such as an electric motor or other rotational actuator such as a driven slewing bearing. Reel speed sensor 624 is optionally in communication with the controller 620 and optionally detects the speed that the reel 402 is rotated. Conduit sensor 626 is further in communication with the controller. In particular, the conduit sensor 626 is configured to detect tension in the hose created by the speed of the vehicle as sensed by vehicle speed sensor 628 relative to the dispensing rate of the conduit 420 by the reel 402 or the sag in the conduit 420 from a desired hose position as the tension varies.

As illustrated, the conduit sensor 626 may comprise at least one rotating arm 650 (or opposed arms on opposite sides of reel 402) in physical contact with the conduit 420 (e.g., through track 604 or another element) with a rotation sensor connected to the arm 650 to detect a change in arm position relative to vehicle frame 406 as the conduit 420 rises when under greater tension and sinks as tension drops. In other embodiments, the carriage 602 can include a measurement zone and one or more beam sensors are positioned on opposing sides of the carriage 602 to detect the rise or fall of the conduit 420 with respect to the vehicle frame 406 as particular beams are broken. Other sensors may be used to measure the position of the conduit such as reflectance sensors or ultrasonic sensors. Conduit sensor 626 is optionally positioned in a location where changes in tension (or relative position of conduit 420 with respect to vehicle frame 406) result in a change of conduit position. In some embodiments, this location will be at, adjacent to or near the rear of the vehicle. The control assembly 600 may adjust reel speed based on a combination of one or more of vehicle speed, GPS position, reel speed, and conduit position.

In one example, the control assembly 600 will adjust the reel speed so that the conduit tension created by the relative speed between the reel 402 and vehicle 400 keeps the conduit 420 centered in a measurement range (or within a defined threshold) of the conduit sensor 626. As the conduit sensor 626 detects that the conduit 420 is dropping in the measurement zone due to changes in vehicle speed or other causes, the control assembly 600 optionally rotates the reel 402 slower to increase tension in the conduit 420. If the sensor 626 detects that the conduit 420 is rising to the top of the measurement zone, the control assembly 600 optionally increases reel speed to reduce tension so the conduit 420 sags and is re-centered in the measurement zone. The operator is optionally enabled to choose to set a custom position target through a user interface connected to the control assembly 600.

As the vehicle 400 moves forward, the control assembly 600 operates to turn reel 402 at a rate so that the conduit 420 is dispensed at a speed equal to movement of the vehicle 400. The conduit 420 passes through the carriage 602 selectively positioned to align the conduit 420 with the wrap that is either being dispensed or retracted by the reel 402. The position of the carriage 602 may be controlled by a motor driven by a control system or may be driven by a chain connected to the drive system of the reel 402 and timed so that the position of the carriage 602 matches a particular wrap of conduit 420 on the reel 402 at the correct time.

The carriage 602 may further include conduit engaging features that include a conduit dispenser that tensions the conduit 420 as it is dispensed off the reel 402 and laid on the ground at a net zero speed relative to a speed of the vehicle 400. In one embodiment, the dispenser includes one or more rubber wheels biased toward the conduit 420 and driven at a speed equal to the speed of the vehicle 400. Without a dispenser, the conduit 420 may become slack on the reel 402 while the vehicle 400 turns around an arc and can no longer pull tension through the conduit 420 back to a location where the inlet of the conduit 420 is mounted or the vehicle 400 may pull conduit 420 across the ground after it completes the turn causing the conduit 420 to damage crop. By ensuring the conduit 420 leaves the vehicle 400 equal and opposite to the ground speed, the conduit position can be maintained on the ground and tension maintained on the conduit 420 still on the reel 402. As conduit 420 is rewrapped on the reel 402 as the vehicle 400 reverses, the hose dispenser may be turned at a speed slightly less than the vehicle speed so some skidding occurs on the hose and tension is maintained.

Figure 11B:
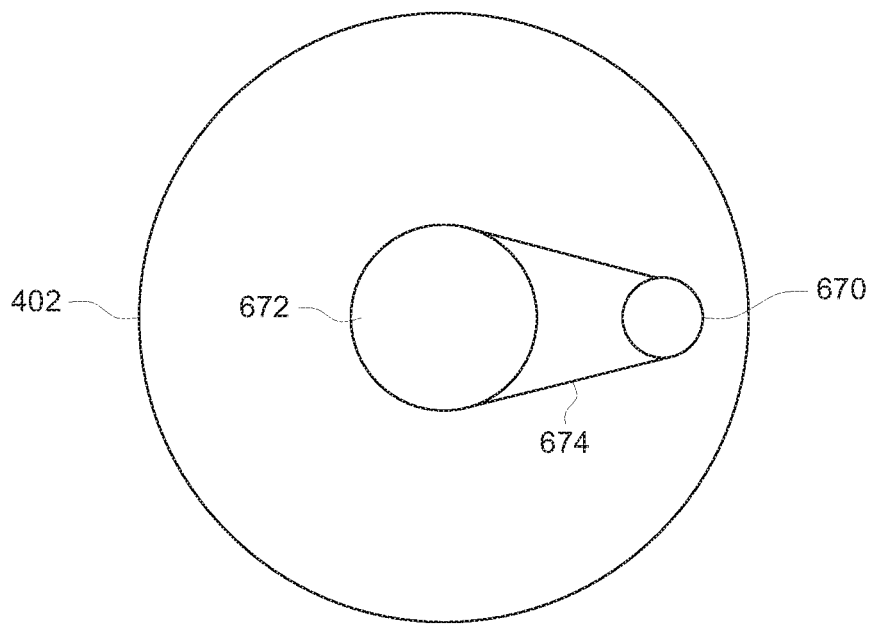
FIG. 11B is a schematic side view of a reel and a drive member.
Figure 11C:
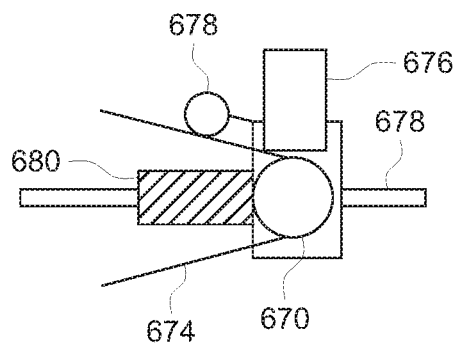
FIG. 11C is a schematic side view of a reel drive assembly.
Figure 11D:
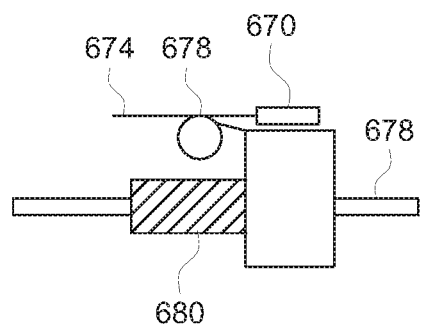
FIG. 11D is a schematic top view of the reel drive assembly of FIG. 11C.

As illustrated in FIGS. 11B-D, the speed of the reel 420 may be controlled by measuring the torque required to turn the reel 420, which is directly related to the tension created in the conduit 420 by the conduit dispenser on the carriage 602. In the illustrated embodiment, a drive gear 670 is connected to a reel gear 672 through a drive chain 674. The drive gear 670 is turned through a gearbox by a motor 676. The motor, gearbox, and drive gear are mounted to slide on rods 678 and positioned to compress a spring 680 as the torque to turn the reel 402 increases. A chain tensioner 682 is mounted to keep the drive chain tight as the drive gear changes position on the rods 678. In one embodiment, a position sensor can be mounted to measure the position of the drive gear on the rods and report a change in position to the controller 540. The speed of the reel 402 is then adjusted by the controller 540 to maintain the position of the drive gear 670 at a target position. In operation, as more conduit 420 is needed to match the ground speed of the vehicle 400, the conduit dispenser can pull harder on the conduit 420, causing the drive gear 670 to be pulled closer to the reel gear 672 while compressing the spring 680. The controller 540 will detect the change in position by the position sensor and increase the speed of the reel 402 providing more conduit 420 to the conduit dispenser and reducing the tension in the conduit 420. The spring 680 will push the position of the drive gear 670 back to the target position as the needed reel speed is reached.

Figure 12:
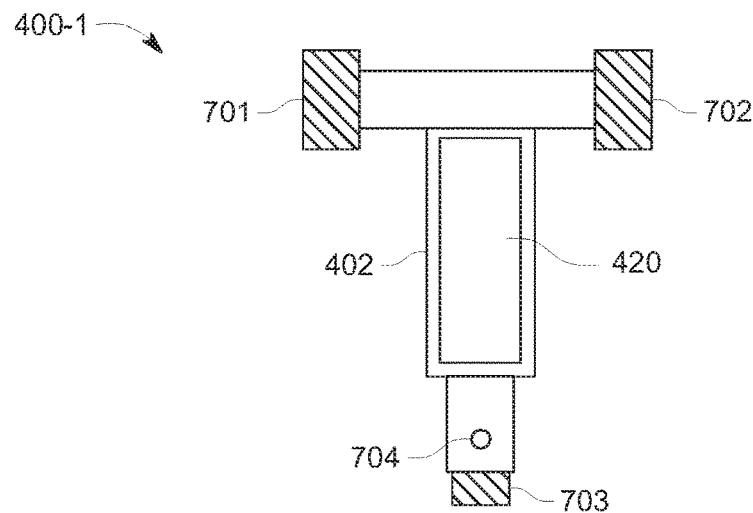
FIGS. 12-14 are schematic top views of different wheel arrangements for a crop input applicator vehicle.

Vehicle 400 can be driven in various ways. As illustrated in FIG. 12, a first configuration 400-1 of vehicle 400 is supported by three wheels. Two wheels 701 and 702 can be positioned on opposite corners of a front of the vehicle 400 and a third wheel 703 can be mounted on a centerline and positioned at a rear of the vehicle 400. The configuration 400-1 of the wheels 701-703 may also be reversed with two wheels mounted at the rear and the single wheel at the front. In one embodiment, the wheels 701 and 702 are driven by electric motors or other rotation actuators and the third wheel 703 is not driven. In other embodiments, all three wheels 701-703 may be driven. The third wheel 703 may be mounted on a bearing or rotation shaft 704 that allows the third wheel to freely caster as the direction of the vehicle changes. The third wheel 703 may also be steered by an actuator to change direction of the vehicle 400. Conduit 420 dispensed from reel 402 may either be dispensed between the two driven wheels 701 and 702 if the wheels are at the rear of the vehicle 400. Alternatively, the conduit 420 can be dispensed over the top, beside, or near the single wheel 703 if wheel 703 is at the rear. The conduit 420 can further pass under the single wheel 703 in embodiments in which a wheel with a cupped shape is used that provides a tunnel for the conduit 420 to pass through.

Figure 13:
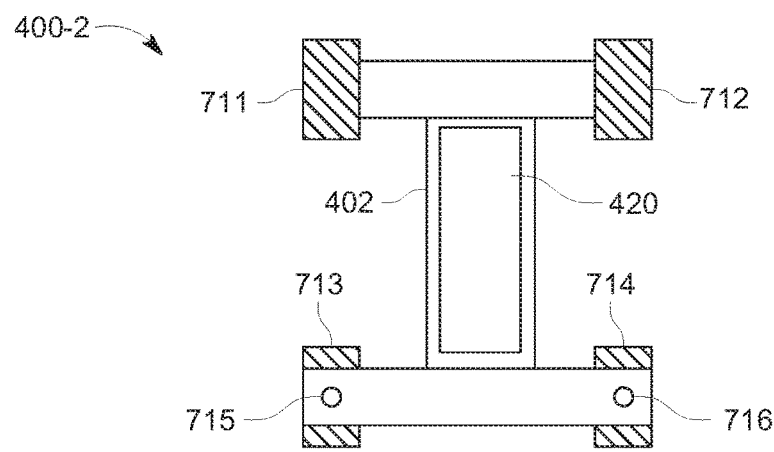
Figure 14:
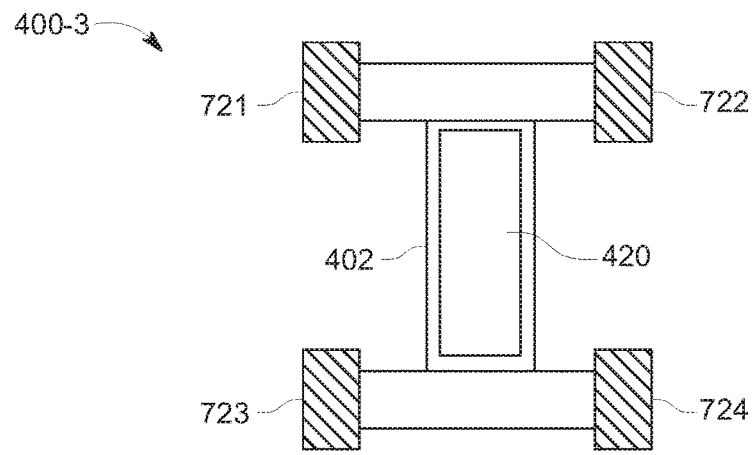

In another configuration 400-2 illustrated in FIG. 13, the vehicle includes four wheels 711-714. Wheels 711 and 712 are driven by a motor or other actuator, while wheels 713 and 714 are positioned to rotate about a bearing or rotation shaft 715 and 716, respectively. In yet another configuration 400-3 as illustrated in FIG. 14, two left wheels 721 and 723 may be driven together and the two right wheels 722 and 724 may be driven together. The vehicle in this configuration 400-3 may be steered by changing the speed of one pair of wheels to allow the vehicle to skid steer in a new direction.

In any of the configurations 400-1 to 400-3, the wheels may be positioned on the vehicle at a spacing to pass down the center of rows of crops to minimize damage to the crops.

Figure 15:
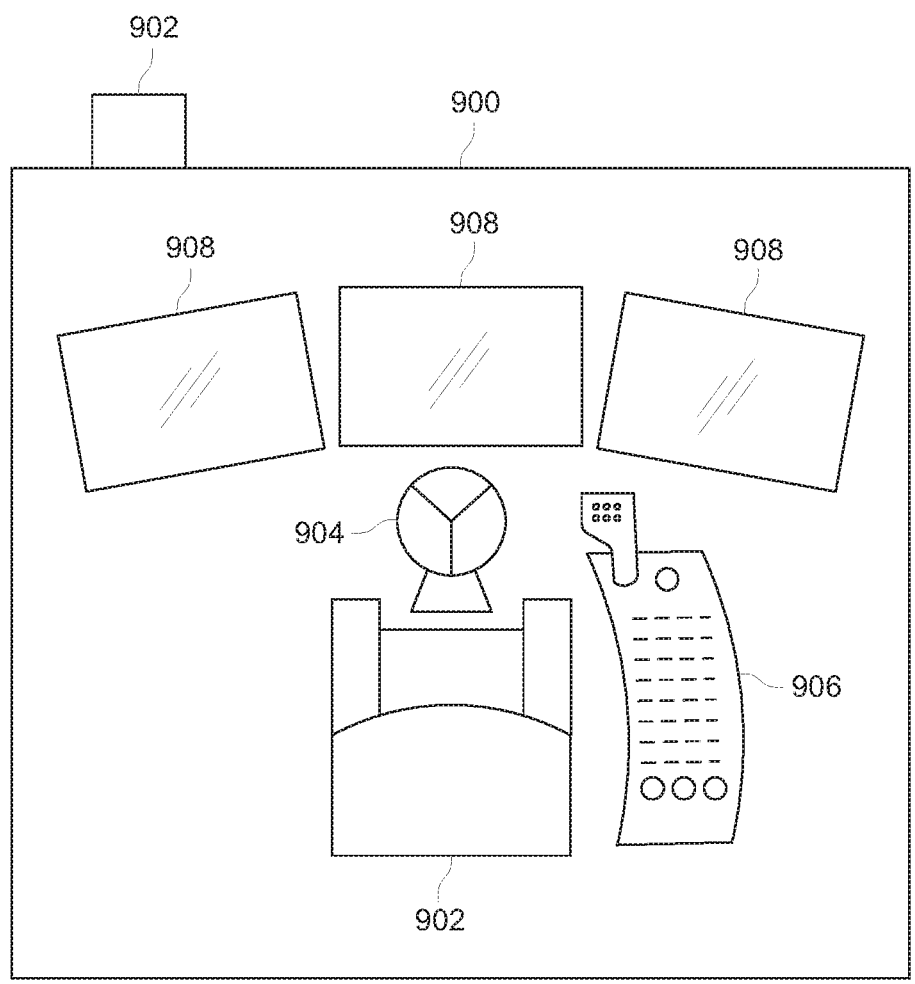
FIG. 15 is a schematic view of an operator station.

As illustrated in FIG. 15, an operator station 900 may be located at a farm management location, such as an operator's home, farm office, equipment storage shop or other location where the operator is running the farm. The operator station 900 is connected through a data connection 902 such as cellular or another wireless data transfer method to one or more vehicles 100/400 discussed herein within one or more fields. Operator station 900 can access one or more cameras, thermal sensors, thermal cameras, LIDAR, radar, capacitance sensors, resistance sensors, conductivity sensors, infrared sensors, light sensors, soil color sensors, organic matter sensors and other sensors mounted on the vehicle 100/400 or vehicles 100/400 positioned to collect data related to crop plants, weeds, soil, field environment, weather, current vehicle status and position, the future vehicle path, or other data relevant to the operator or control system.

The operator station 900 can include common features of a farm equipment cab including a seat 902 for the operator and operator controls including a steering wheel 904, foot pedals, control buttons and switches, or joysticks 906 and a data display or displays 908 such as a smart phone, smart tablet, smart television, projector, virtual display headset, or other data projector. In other embodiments, the operator station 900 may be a web app, mobile app, or other user interface accessed through a smart phone, computer, smart television, touchscreen display, virtual display headset, or similar device. Data from environment sensors is displayed to the operator through the operator station 900 and in particular displays 908. The data may be displayed realtime, near real-time, or as historical or time delayed data. The data may comprise a direct visual feed from a camera or a simulated visual representation created from combining thermal inputs, cameras, or other sensors. Data may also be displayed as numerical values or as a map of values displayed geographically. Based on the data displayed for a particular vehicle, the operator may be enabled to change machine settings, create a control path for a selected vehicle to drive, or take control of the selected vehicle and drive it to a new location. As a mobile vehicle has completed operations in a field, the operator may be enabled to take control to drive the vehicle on public roads to another field using the camera inputs and operator controls in the operator station. The operator may be shown a summary display of data from multiple vehicles. Indications (e.g., audio, visual) can be made to the operator that a selected vehicle needs attention. The operator may then be enabled to select a particular vehicle from the summary display to see data from that vehicle and then may further select a specific camera or sensor to see more detailed real-time or historical data.

Figure 20:
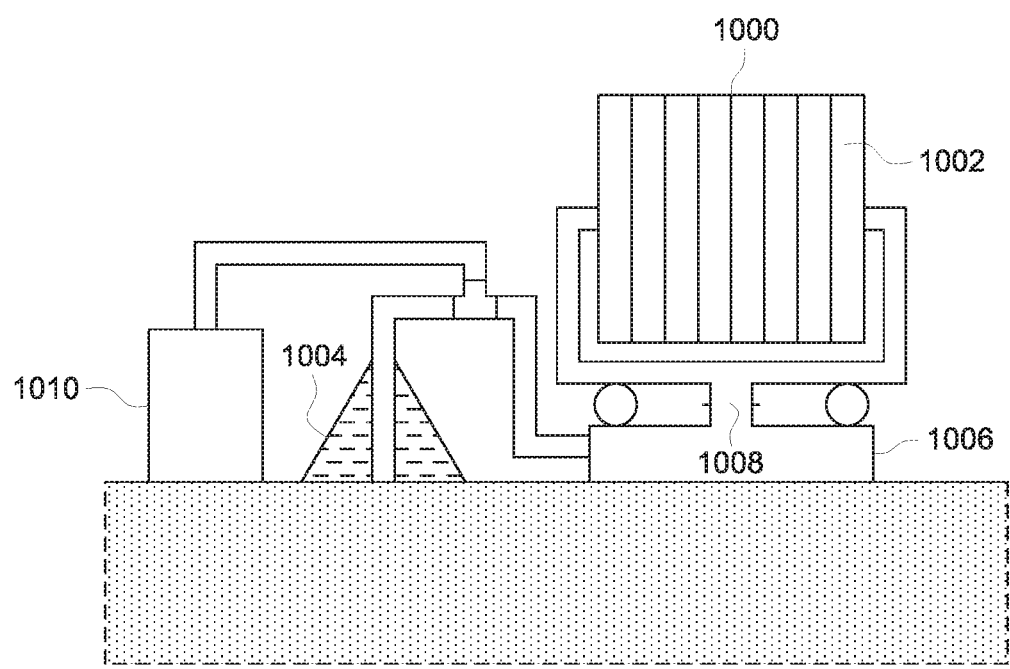
FIG. 20 is a schematic side view of a stationary supply reel positioned within a field.

Other ways to supply vehicles 100/400 can be utilized as described herein. In one embodiment illustrated in FIG. 20, a supply reel 1000 supporting a supply conduit 1002 is placed near a water source 1004. The supply reel 1000 is mounted on a rotatable base 1006 such that the supply conduit 1002 is dispensed to a supply vehicle 200 or crop input applicator vehicle 100/400 in any direction. The supply reel 1000 is connected to the water source 1004 through a rotatable fluid connection 1008. The supply conduit 1002 can be drug along the ground by a connected vehicle. In addition, an air supply 1010 may be used to purge the supply conduit 1002 of water prior to it being drug to a new location, which will reduce the weight of the supply conduit 1002 and lessen the necessary pulling force from the vehicle.

Figure 21:
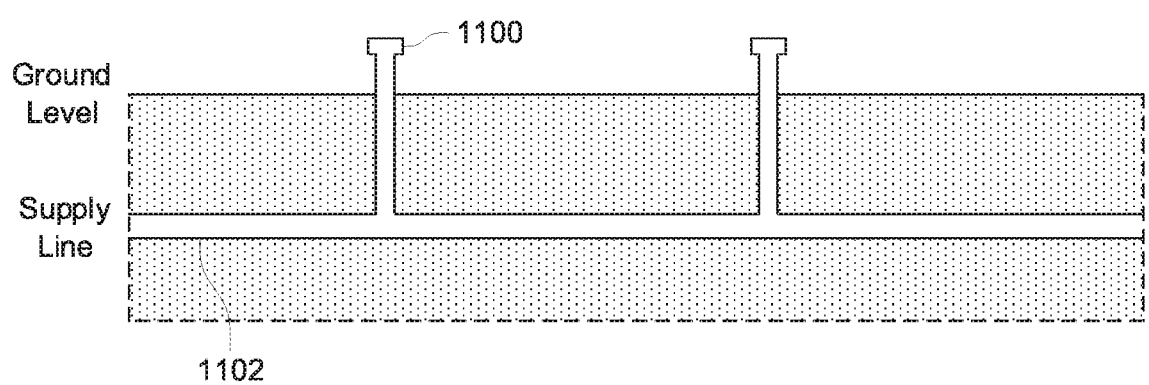
FIG. 21 is a schematic side view of a supply line positioned below ground and having a plurality of hydrants.

In a further embodiment illustrated in FIG. 21, hydrants 1100 may be used to provide water to a crop input applicator vehicle 100/400 or a supply vehicle 200. In one embodiment, a supply line 1102 is buried below ground level and connected to a water source and the hydrants 1100. In one embodiment, the supply line 1102 is made of polyvinyl chloride (PVC) or high-density polyethylene (HDPE). The spacing between hydrants 1100 may be equal the width of the boom on the vehicle, the width of the passes in the field, or other spacings based on the terrain of the field and the location of the water source.

Figure 22:
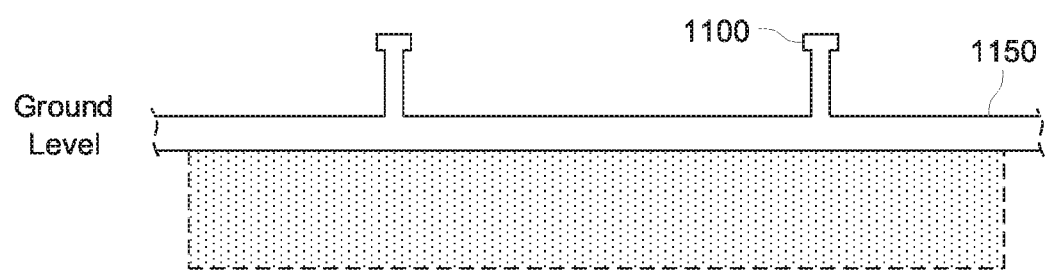
FIG. 22 is a schematic side view of a supply line positioned above ground and having a plurality of hydrants.

In another embodiment illustrated in FIG. 22, a supply line 1150 having hydrants 1100 may be disposed above ground level. Supply line 1150 can be made of a wear resistant material such that a vehicle is able to drive over the supply line 1150 without damaging it. For example, the supply line 1150 can be a lay-flat hose and the vehicle may be in communication with the water supply to stop the water source from pressurizing the supply line when the vehicle is ready to cross. As the pressure stops, the supply line 1150 will deflate and allow the vehicle to cross it without damage. The vehicle then alerts the water source to pressurize the supply line 1150 allowing it to continue irrigating.

Figure 23:
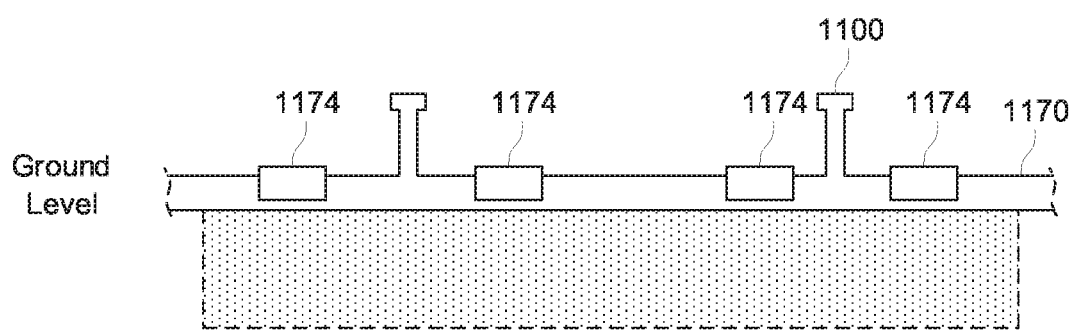
FIG. 23 is a schematic side view of a supply line positioned above ground and having a plurality of hydrants and a plurality of reinforcement members coupled with the supply line.

In yet another embodiment illustrated in FIG. 23, a supply line 1170 having hydrants 1100 includes spaced apart bridges 1174 formed of steel or other high-strength structural material and placed over the supply line 1170 to provide cross over points for a vehicle. The bridges 1174 can be spaced at a distance equal to the wheel base of the vehicle. In one embodiment, hydrants 1100 include a location beacon that guides the vehicle to the correct position to align with the bridges.

Figure 24:
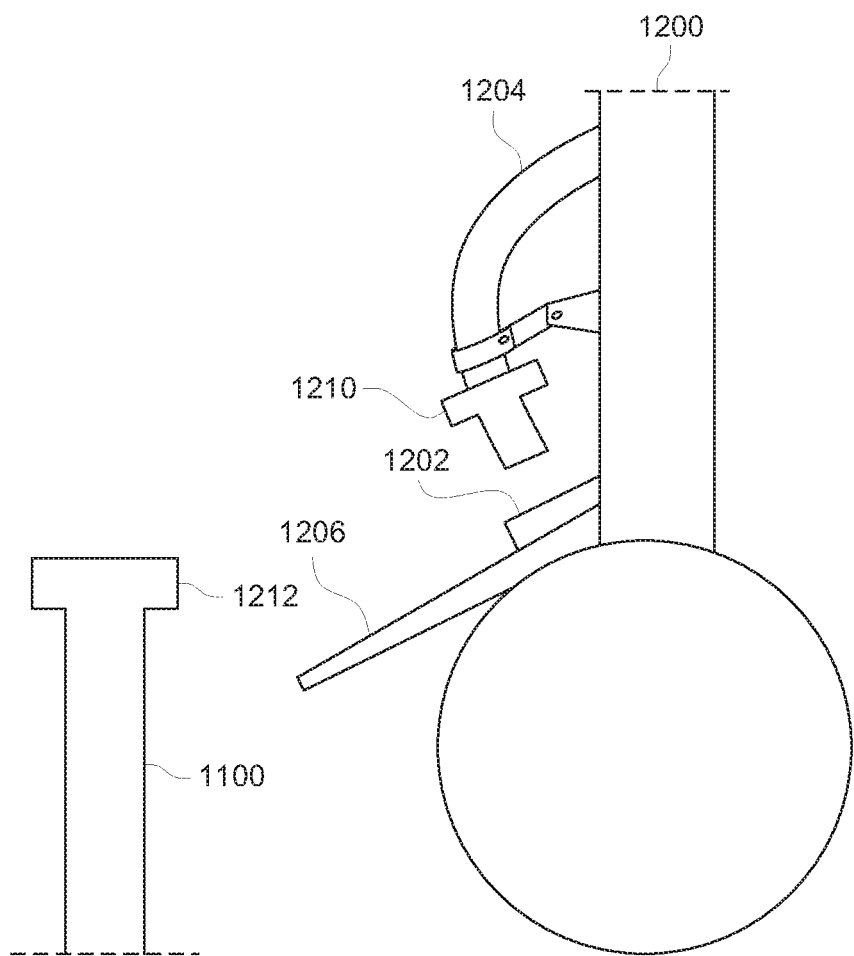
FIG. 24 is a schematic side view of a docking station for a vehicle to connect to a hydrant.
Figure 25:
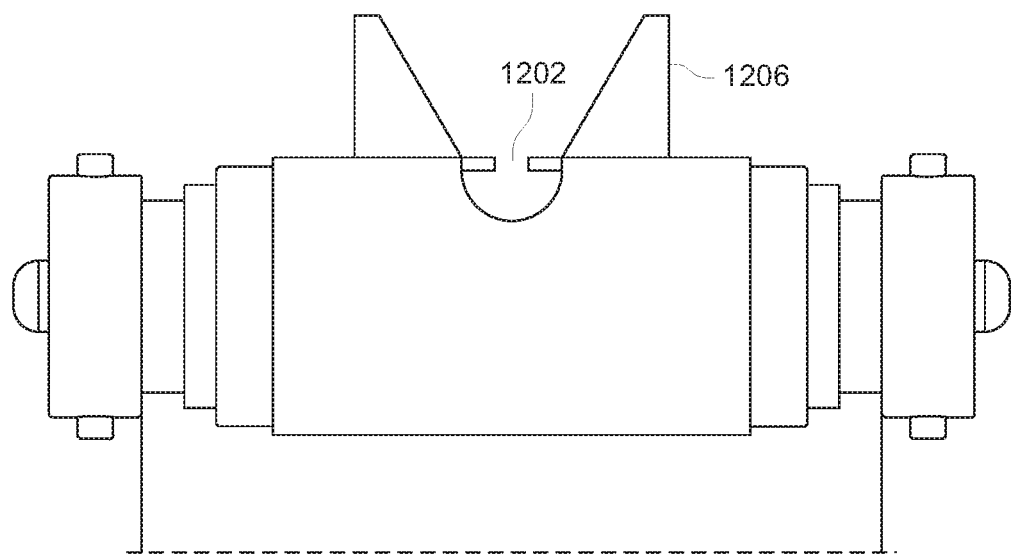
FIG. 25 is a schematic top view of the docking station of FIG. 24.

In order to access a hydrants 1100, a vehicle 1200 can be equipped with a docking station 1202 for use in connecting a conduit 1204 as illustrated in FIGS. 24 and 25. Docking station 1202 includes extending arms 1206 that guide the vehicle 1200 such that the hydrant 1100 engages the docking station 1202. After the hydrant 1100 engages the docking station 1202, a mating connector 1210 is locked into a guidance cap 1212 on hydrant 1100.

Figure 26:
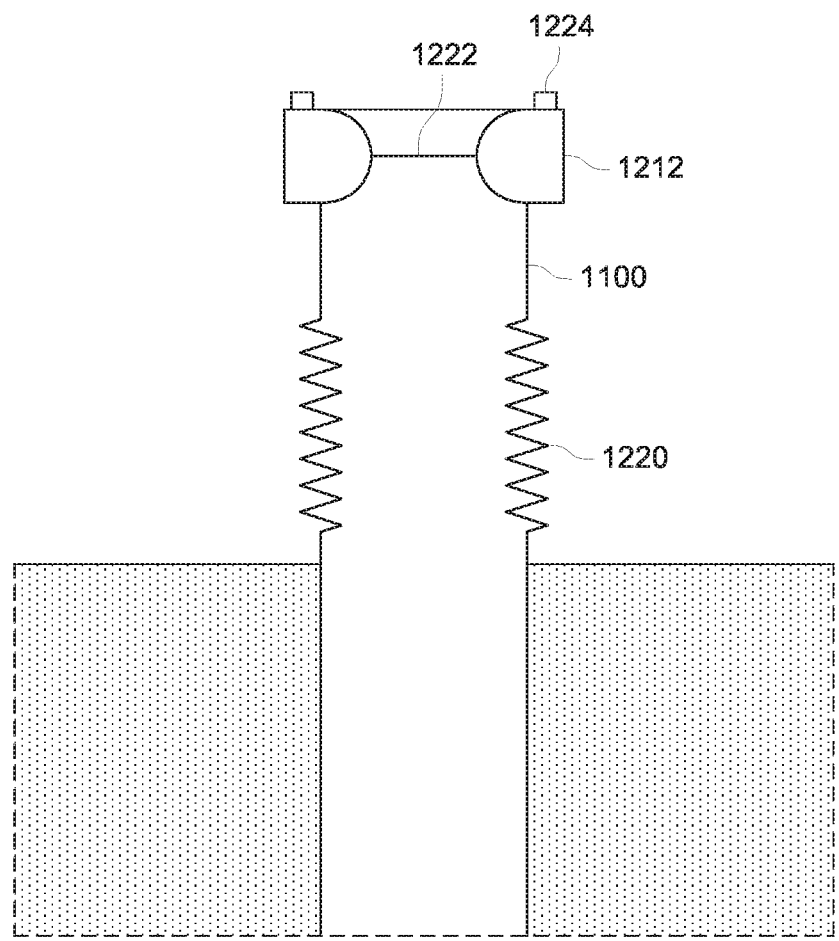
FIG. 26 is a schematic view of a first hydrant.
Figure 27:
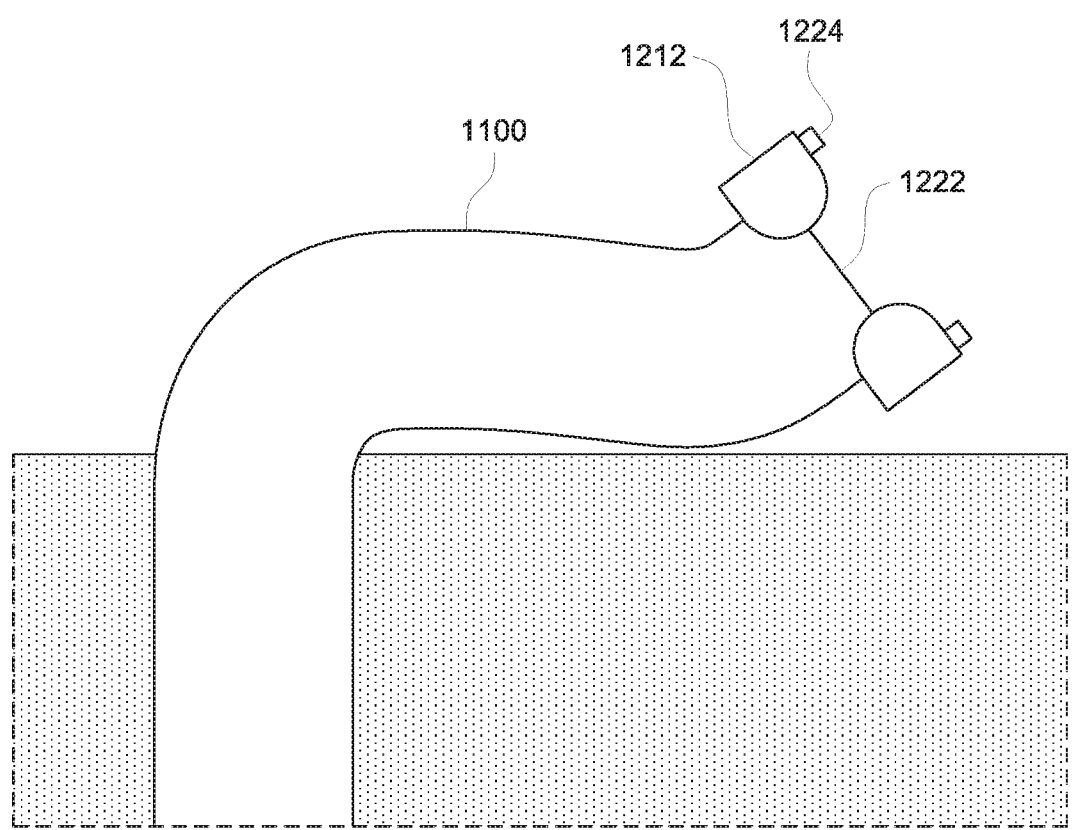
FIG. 27 is a schematic view of a second hydrant.

Example hydrants 1100 and 1100' are illustrated in FIGS. 26 and 27, respectively. Guidance cap 1212 can include a flow gate 1222 and one or more locating beacons 1224. Mating connector 1210 on vehicle 1200 is configured to extend into and open the flow gate 1222, allowing liquid to pass into the conduit 1204. Locating beacons 1224 provide a signal to alert that a connection has been made successfully. In one embodiment, the beacons 1224 are magnets and the mating connector 1210 includes one or more hall-effect sensors to detect the presence of magnets indicating a successful connection has been made. Flow gate 1222 is positioned in the hydrant and sealed closed by water pressure in the hydrant. As the mating connector 1210 attaches to the hydrant 1100, the flow gate 1222 is pushed open allowing flow to pass by through the mating connector 1210 and into the conduit 1204. After vehicle 1200 has completed one or more passes that align with the hydrant 1100, the mating connector 1220 is disconnected and the vehicle 1200 moves to the next hydrant 1100 and the connection process is repeated.

Hydrant 1100 in FIG. 26 includes an elongate flexible section 1220 extending to distal guidance cap 1212. The flexible section 1220 allows hydrant 1100 to bend over to the ground level when contacted by an implement like a planter or a combine head. Hydrant 1100' in FIG. 27 is formed of flexible material and can lay at ground level when not in use.

Figure 28:
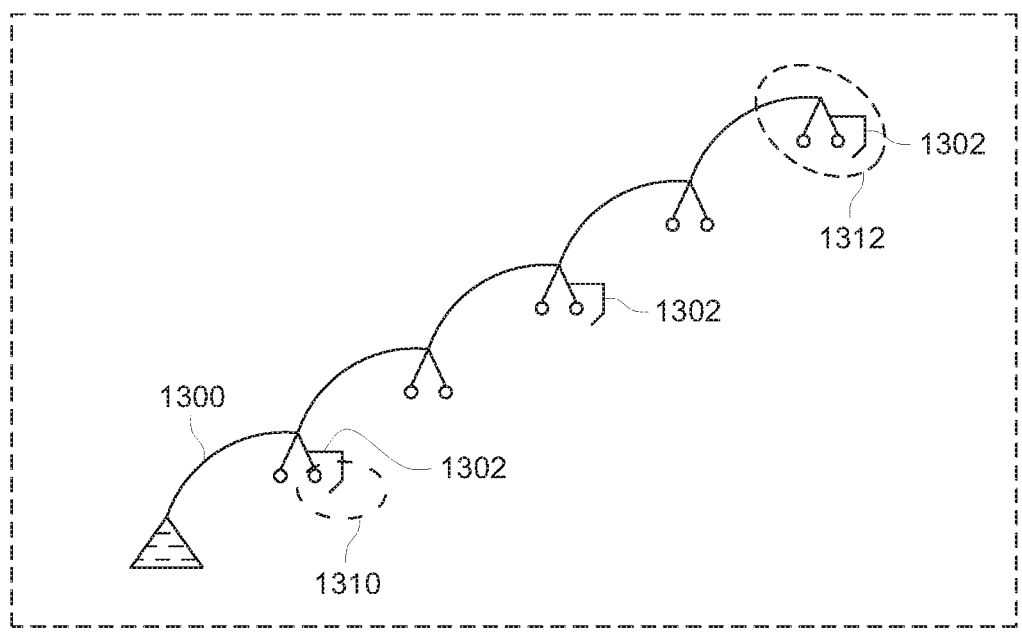
FIG. 28 is a schematic view of a field having a pivot irrigation system.

Concepts presented herein can further be used in connection with pivot irrigation systems or other liquid application systems. One example of a pivot irrigation system 1300 is illustrated in FIG. 28. The pivot irrigation system 1300 can include one or more ground penetrating members supporting one or more environmental sensors 1302 at one or more locations to measure soil moisture as the system 1300 turns in an arc. Operator station 900 can be used to adjust a speed that the pivot irrigation system 1300 is turned, a master valve, section valves, or individual nozzle valves to change a rate of liquid applied to match the needs measured by the sensors 1302 on the ground penetrating members. Sensor measurements, data storage and transfer, and control decisions may be the same as described herein. The operator may be enabled to park (e.g., stop) the pivot irrigation system 1300 in a location in the field so that sensors 1302 continue to collect and report data from a relevant soil area. Operator station 900 can optionally be used to select a location or suggest multiple locations to the operator where multiple sensors along a length of the pivot irrigation system 1300 are positioned in relevant soil areas in the field. For example, one sensor may be positioned by the control system in the historically driest area of the field (denoted 1310) and another sensor in the historically wettest area of the field (denoted 1312). If driest and wettest areas are unreachable in one pivot position, a best fit recommendation may be made to the operator that selects the driest area and second wettest area as an example.

Figure 29:
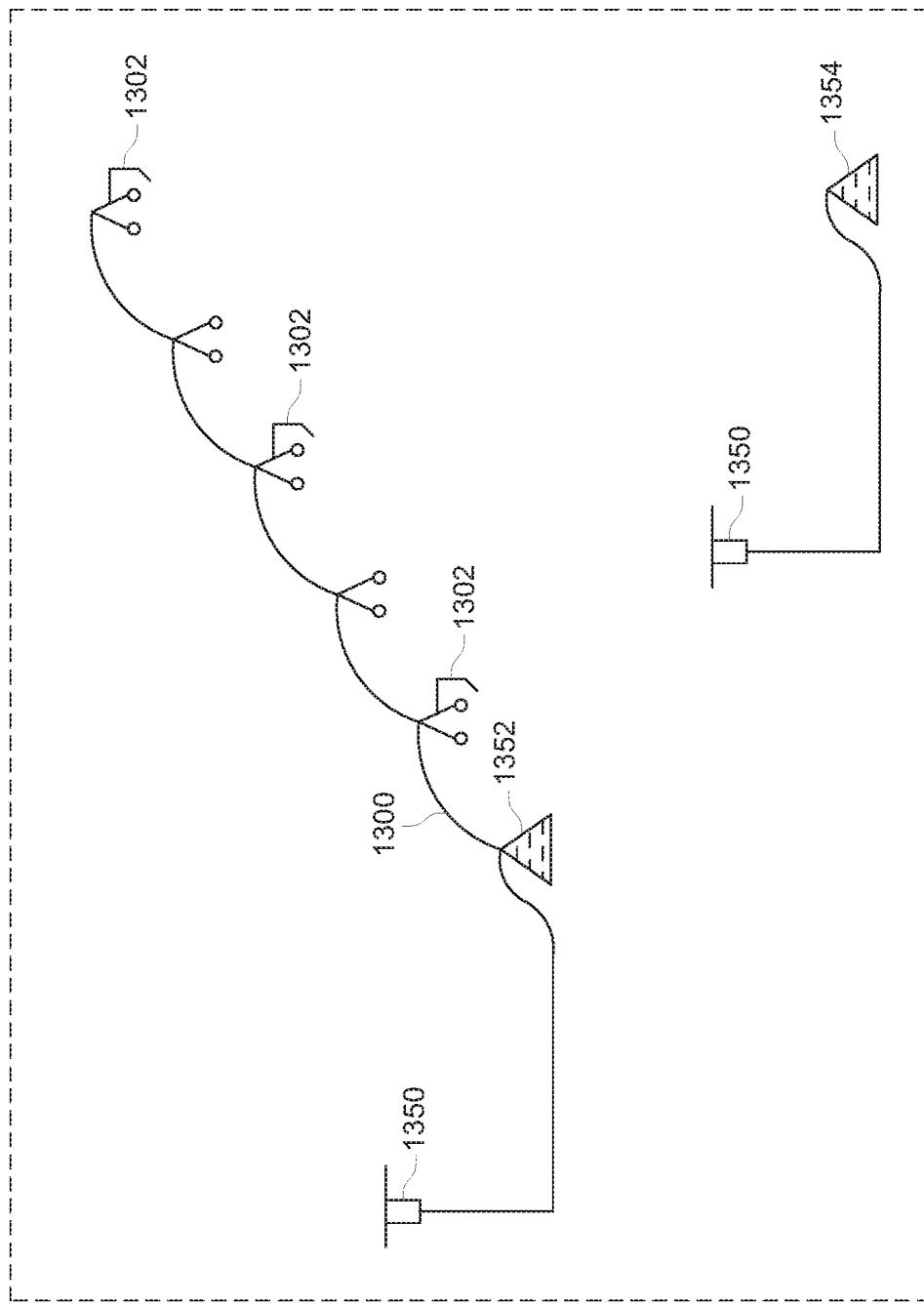
FIG. 29 is a schematic view of a field having a pivot irrigation system and a plurality of crop input applicator vehicles.

As illustrated in FIG. 29, one or more vehicles 1350 can be used with pivot irrigation system 1300. Using pivot irrigation system, two or more parked locations may be selected by the operator using the operator station 900 and the pivot irrigation system 1300 or a vehicle 1350 in the field could move between those locations on a schedule as decided by the operator based on historical data or on weather data collected from a weather data service such as NOAA or from a stationary sensor or environmental sensor such as a rain gauge or weather station positioned in the field, on the pivot irrigation system, or on a vehicle. Measurement passes may be scheduled to rotate the pivot irrigation system 1300 or drive through the field with the vehicle 1350 while taking measurements from sensors while not applying any input. After measurements are complete, the operator or control system may create an application plan to be applied during the next application pass. As illustrated, vehicles 1350 can be fluidly coupled to the same water source 1352 as pivot irrigation system 1300 or to a separate water source 1354.

Figure 30:
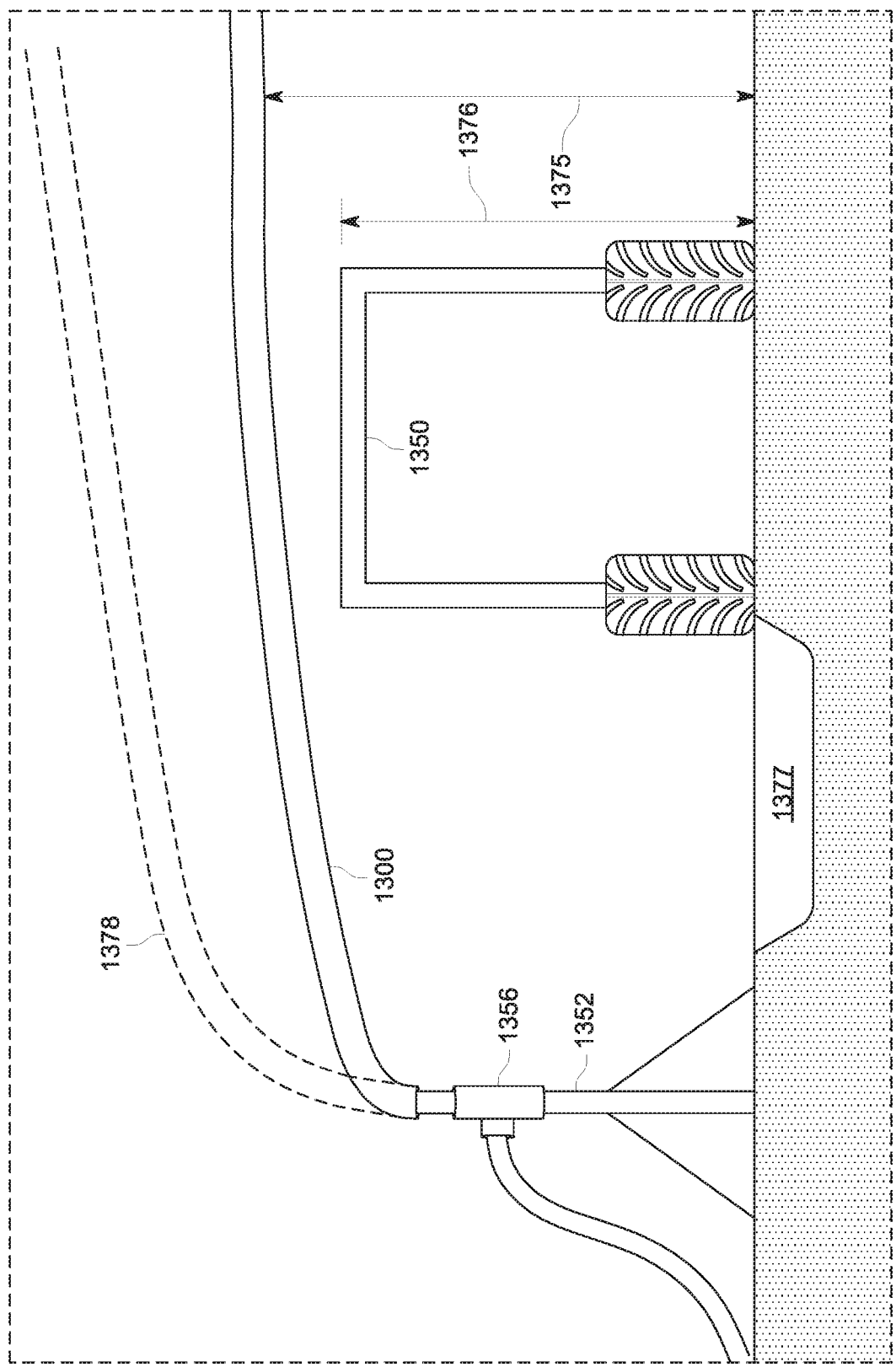
FIG. 30 is a schematic side view of a pivot irrigation system and a crop input applicator vehicle.

As illustrated in FIG. 30, in some embodiments a vehicle 1350 connected to the pivot liquid source 1352 may be connected through a rotatable connection 1356 to avoid wrapping the conduit 1360 carried by the vehicle 1350 around the pivot liquid source 1352 as the pivot irrigation system 1300 and vehicle 1350 travel through the field on separate paths. In another embodiment, the clearance height 1375 under the pivot irrigation system 1300 is greater than a height 1376 of the vehicle 1350 such that the vehicle 1350 is able to travel around the pivot liquid source 1352 to avoid wrapping conduit when traveling from one location in the field to another. In another embodiment, a portion 1377 near the liquid source may be lowered to provide a path for the vehicle to pass over the pivot irrigation system 1300 without making contact. The pivot irrigation system 1300 may also be raised to a position labelled as 1378 for a portion of its length to provide enough clearance for the vehicle 1350 to pass under.

Operator system 900 can be used to control the pivot irrigation system 1300 and the vehicle or vehicles 1350 such as one or more of the vehicle embodiments described herein. During an application event, the pivot irrigation system 1300 may apply a single rate to its application area and the vehicle 1350 may travel to areas that need additional water and supplement the amount applied by the pivot irrigation system 1300 to meet the needs of the crop in that area as directed by the operator or by environmental sensors connected to the operator system 900 and mounted to the vehicle, pivot, or stationary in the field. The pivot rate of the pivot irrigation system 1300 may be the maximum rate needed for the wettest area of the field as determined from historical data collected from sensors. The vehicle 1350 may then supplement enough water to reach the maximum rate needed by all other areas including the driest area of the field. The pivot irrigation system 1300 and vehicle 1350 may each apply the rate needed in combination to match the rate for an area as directed by a prescription plan provided by the operator. The vehicle 1350 may also apply all of the liquid needed by soil not part of the reachable application area of the pivot irrigation system 1300 such as the corners of a field. After an application event, the vehicle 1350 may be used to apply liquid to areas of the field with less holding capacity or a higher consumption rate from the crop than other areas. As the area of the field needing application increases as determined by the operator or by control system through sensor measurements, the control system would control the pivot irrigation system 1300 to apply a base rate while simultaneously applying liquid through the vehicle or vehicles 1350. The controller 540 may direct the vehicle 1350 to apply to areas ahead of the pivot irrigation system 1300 to allow the vehicle 1350 to drive on dry ground. For example, the vehicle 1350 may be applying in the northeast quadrant of the field while the pivot irrigation system 1300 starts applying in the south east quadrant. The vehicle 1350 would then move to the northwest quadrant and the pivot irrigation system 1300 enters the northeast quadrant. The controller 540 may calculate the time required for the pivot irrigation system 1300 and vehicle 1350 and adjust when the two are started and the rate each applies to ensure that the vehicle 1350 stays ahead of the pivot irrigation system 1300. In some implementations, the vehicle 1350 parks near the liquid source while the pivot irrigation system 1300 applies liquid and is passed over by the pivot irrigation system 1300 until the pivot irrigation system 1300 is finished applying. In other implementations, the vehicle 1350 travels in a small circle around the pivot liquid source 1352 ahead or behind the pivot irrigation system 1300 as it applies and then travels to areas needing further application after the pivot irrigation system 1300 has completed its application.

Figure 31:
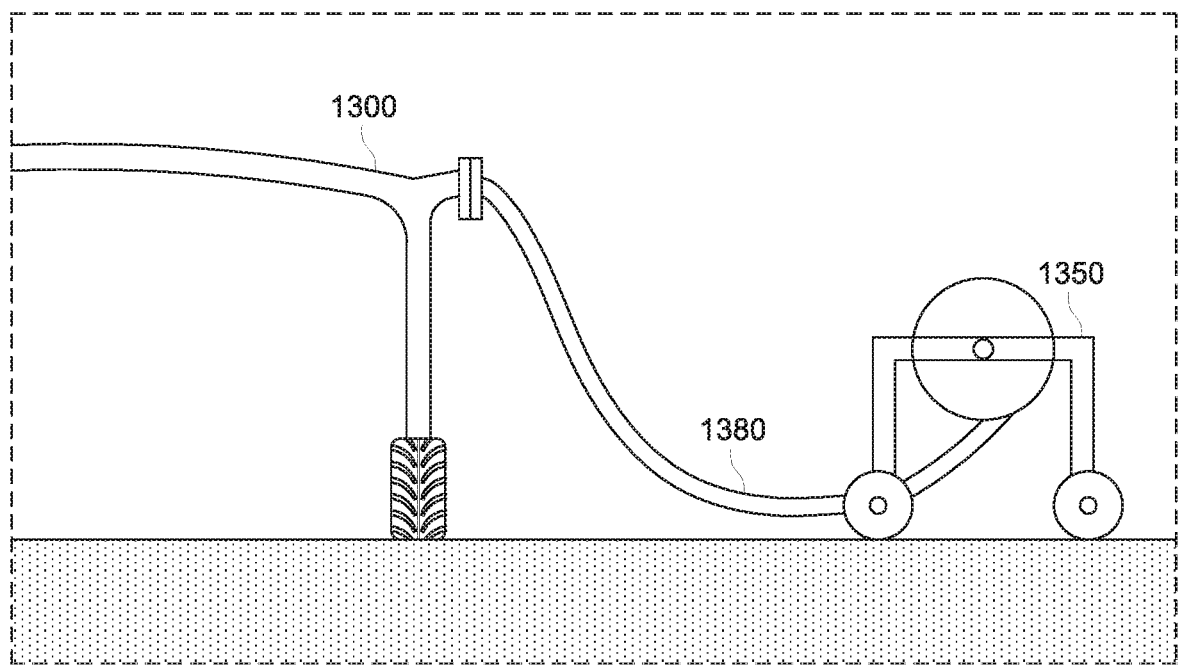
FIG. 31 is a schematic side view of a crop input applicator vehicle fluidly coupled with an end of a pivot irrigation system.

As illustrated in FIG. 31, the vehicle 1350 may be connected through a conduit 1380 to an outer end of the pivot irrigation system 1300 to access a liquid supply. The vehicle 1350 travels with the pivot irrigation system 1300 as it moves and may apply to areas outside the application area of the pivot irrigation system 1300. If an end gun was used previously on the pivot irrigation system 1300, it may be removed to be replaced by the vehicle 1350 and the booster pump that is often used with end guns may be used to provide the necessary pressure to supply liquid to the vehicle 1350. The vehicle 1350 may travel ahead of the path of the pivot irrigation system 1300 and dispense extra conduit such that the pivot irrigation system 1300 may continue to move forward while the vehicle 1350 is a distance away from the pivot irrigation system 1300. In another embodiment, the pivot irrigation system 1300 stops while the vehicle 1350 applies in an area and advances forward after the vehicle 1350 has returned.

Figure 32:
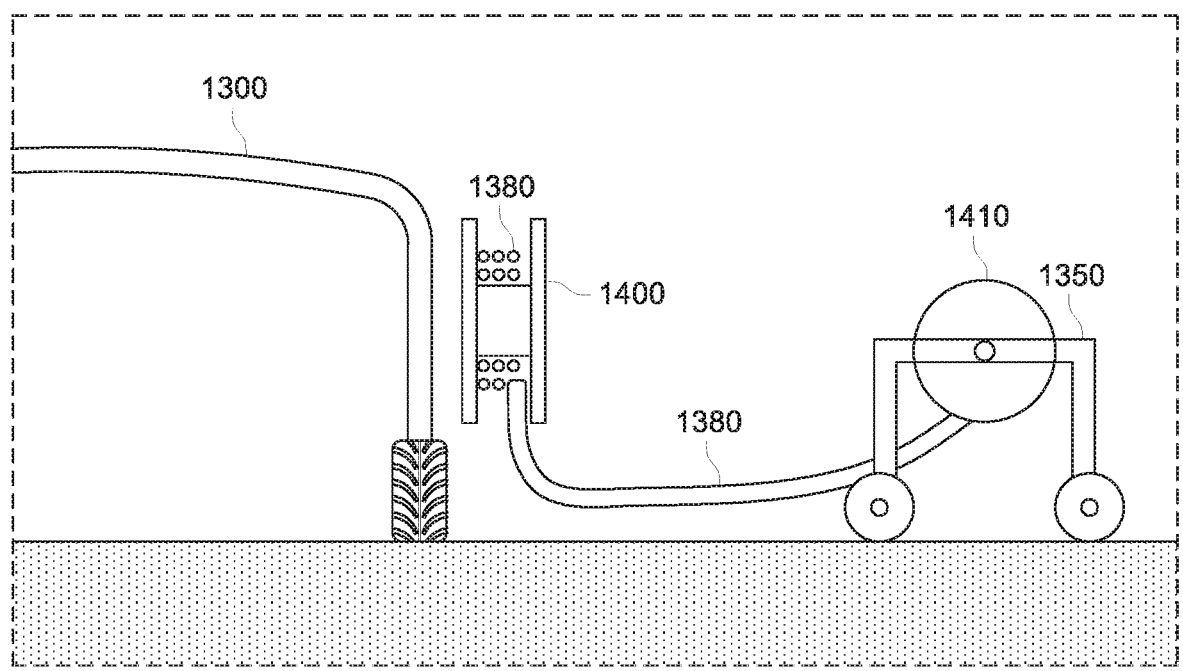
FIG. 32 is a schematic side view of a crop input applicator vehicle fluidly coupled with an end of a pivot irrigation system through a conduit supported by a reel of the pivot irrigation system.

As illustrated in FIG. 32, a secondary conduit reel 1400 is mounted to the end of the pivot irrigation system 1300. Conduit 1380 is carried by the reel 1400 and a reel 1410 on vehicle 1350. One end of conduit 1380 is connected to the pivot reel 1400 and the other to the vehicle reel 1410. As the vehicle 1350 prepares to apply liquid to an area requiring a known length of conduit, the vehicle 1350 optionally moves itself so that the vehicle reel 1410 and the pivot reel 1400 are in alignment such that the conduit 1380 is suspended between the two reels in a reasonably straight line. The controller 540 can calculate a time the vehicle 1350 will spend away from the pivot irrigation system 1300 and the distance that the pivot irrigation system 1300 will travel in that time. The controller 540 then optionally turns both reels to pass the necessary amount of conduit from the vehicle reel 1410 to the pivot reel 1400 so that the pivot irrigation system 1300 may move ahead and dispense conduit 1380 until the vehicle 1350 has returned. After the pivot reel 1400 is loaded, the vehicle 1350 optionally follows an application path while dispensing conduit off the vehicle reel 1410 reel onto the ground until it reaches the end of its path. The vehicle 1350 then optionally backs up and reels up the conduit 1380 including conduit dispensed on the ground by the pivot reel 1400 until it has realigned with the pivot reel 1400 and the conduit 1380 is suspended between the two reels. Then, the process optionally repeats until the field is done or the areas needing application have been covered.

Figure 33:
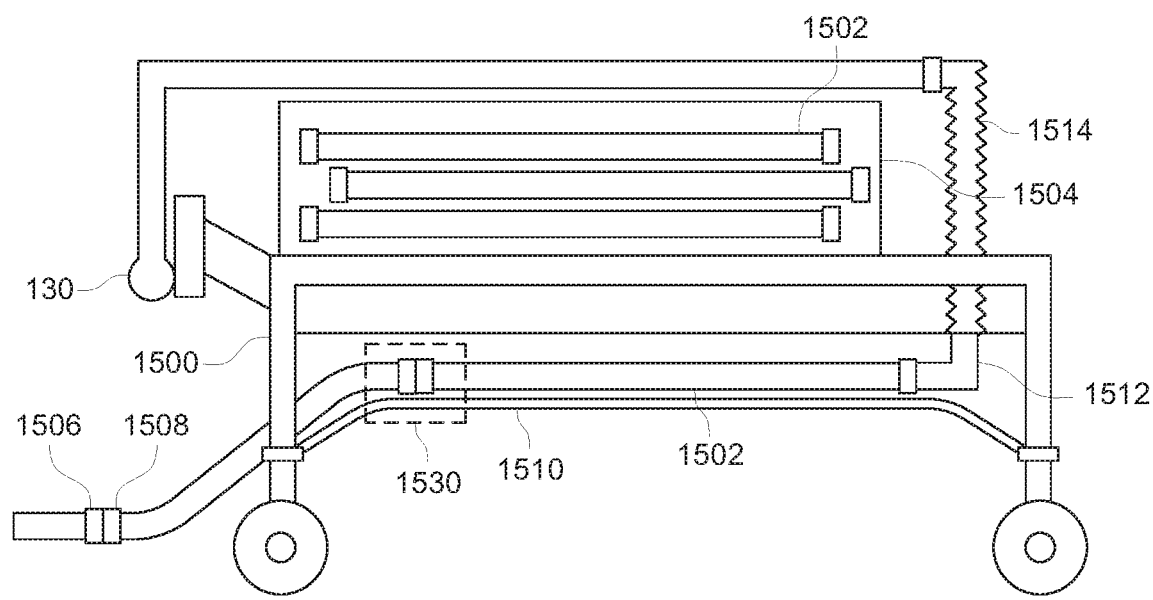
FIG. 33 is a schematic side view of an alternative crop input applicator vehicle having longitudinal conduit sections.

In another embodiment of an irrigation vehicle 1500 illustrated in FIG. 33, a series of fluid conduit sections 1502 may be stored in a storage area 1504. Storage area 1504 may be a tub, rack, or rolling drum with receiving areas to capture individual fluid conduit sections 1502. The fluid conduit sections 1502 may be hose, pipe, or other types of fluid conduits. Each conduit has a mating connector consisting of a first end 1506 and a second end 1508. The first end of a first conduit is connected to the second end of a second conduit forming a continuous length that is connected to a water supply. As the vehicle 1500 advances through a field of row crops, it dispenses the last fluid conduit at a rate equal to the vehicle speed along a guide track 1510. The second end 1508 of the last fluid conduit is connected to a primary connector 1512. The primary connector 1512 receives liquid through the combined length of conduits and passes the liquid through a flexible hose 1514. As the last fluid conduit reaches the end of the guide track, the flexible hose 1514 is fully extended. The flexible hose 1514 is connected to a liquid supply tube 1520 of the vehicle 1500 allowing liquid to be dispensed along a length of a boom 1522 of the vehicle 1500.

After the last fluid conduit 1502 reaches an end of the guide track 1510, the vehicle 1500 is stopped and the water supply is stopped. The primary connecter 1512 disconnects from the first end 1506 and retracts to the opposite end of the guide track 1510. A new fluid conduit 1502 is dropped from the storage area 1504 on to the guide track 1510. The first end 1506 of the last conduit is connected to the second end 1508 of the new conduit in a connection zone 1530. The primary connector 1512 attaches to the first end 1506 of the new conduit and the water supply is restarted. The vehicle 1500 advances forward and the process is repeated until the vehicle 1500 reaches a desired stopping point or all of the available fluid conduits 1502 are used. The vehicle 1500 then reverses direction and the process is reversed with fluid sections being removed from the combined length of conduits and each removed fluid section being restored in the storage area 1504.

Figure 34:
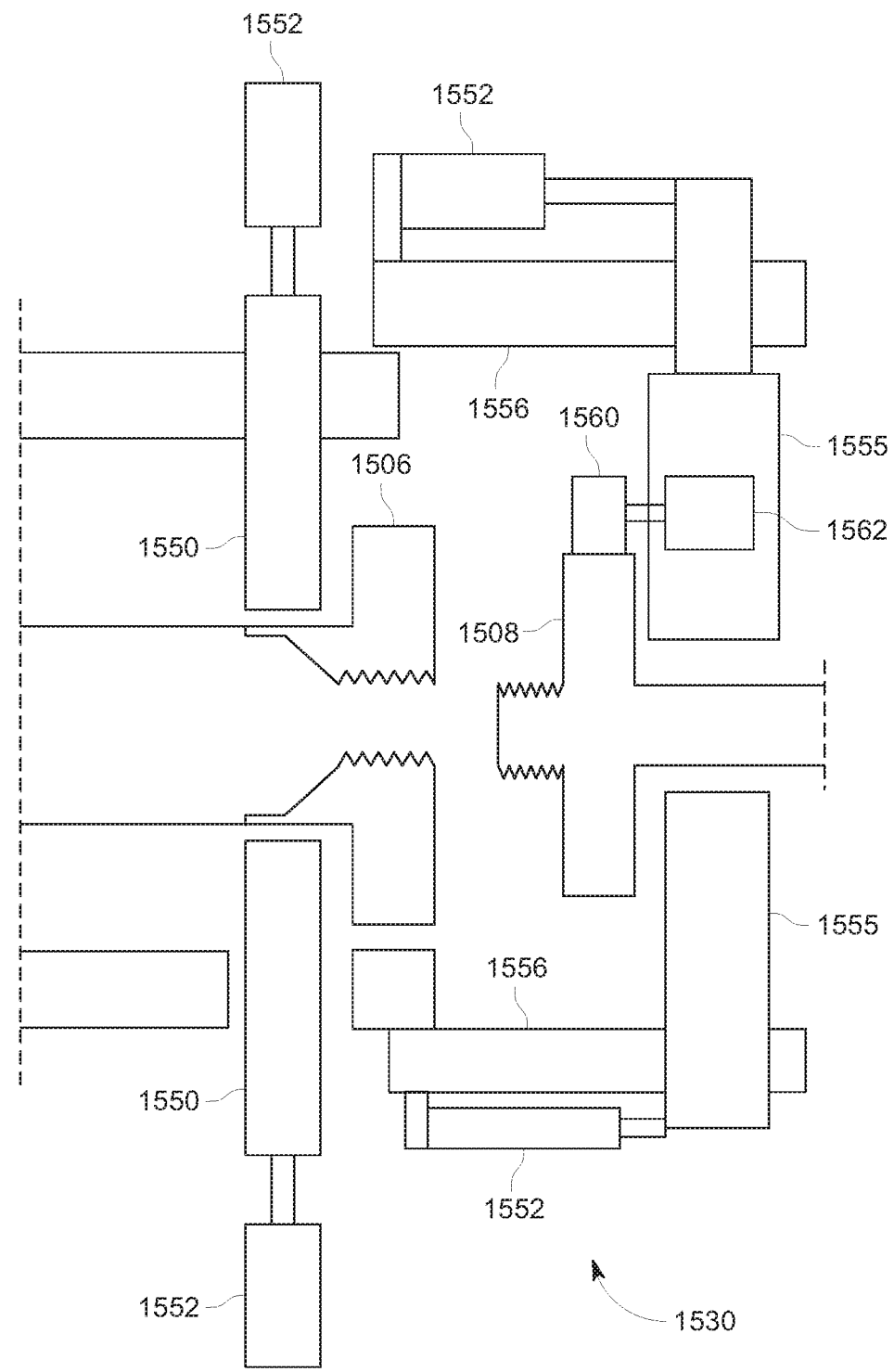
FIG. 34 is a schematic view of a connection zone for the crop input applicator vehicle of FIG. 33.

Further detail of the connection zone 1530 is illustrated in FIG. 34. The first end 1506 of a conduit section is retained in place by clamping arms 1550. Arms 1550 may be selectively driven by actuators 1552 to retain the first end 1506 while being connected or disconnected to the next fluid conduit section or the primary connector 1512. In one embodiment, connectors are threaded and rotated to provide a water tight connection, for example with twist lock, push connect, or other connector styles may be used. The second end 1508 of the next fluid conduit section is pulled toward the first end 1506 of the last conduit using pulling arms 1555 which may translated along guides 1556 and be driven by actuators 1552. As ends are ready to be connected or disconnected, the second end may be rotated by a motor 1560 through a gear 1562 into mating teeth on the exterior of the second end 1508.

Figure 35:
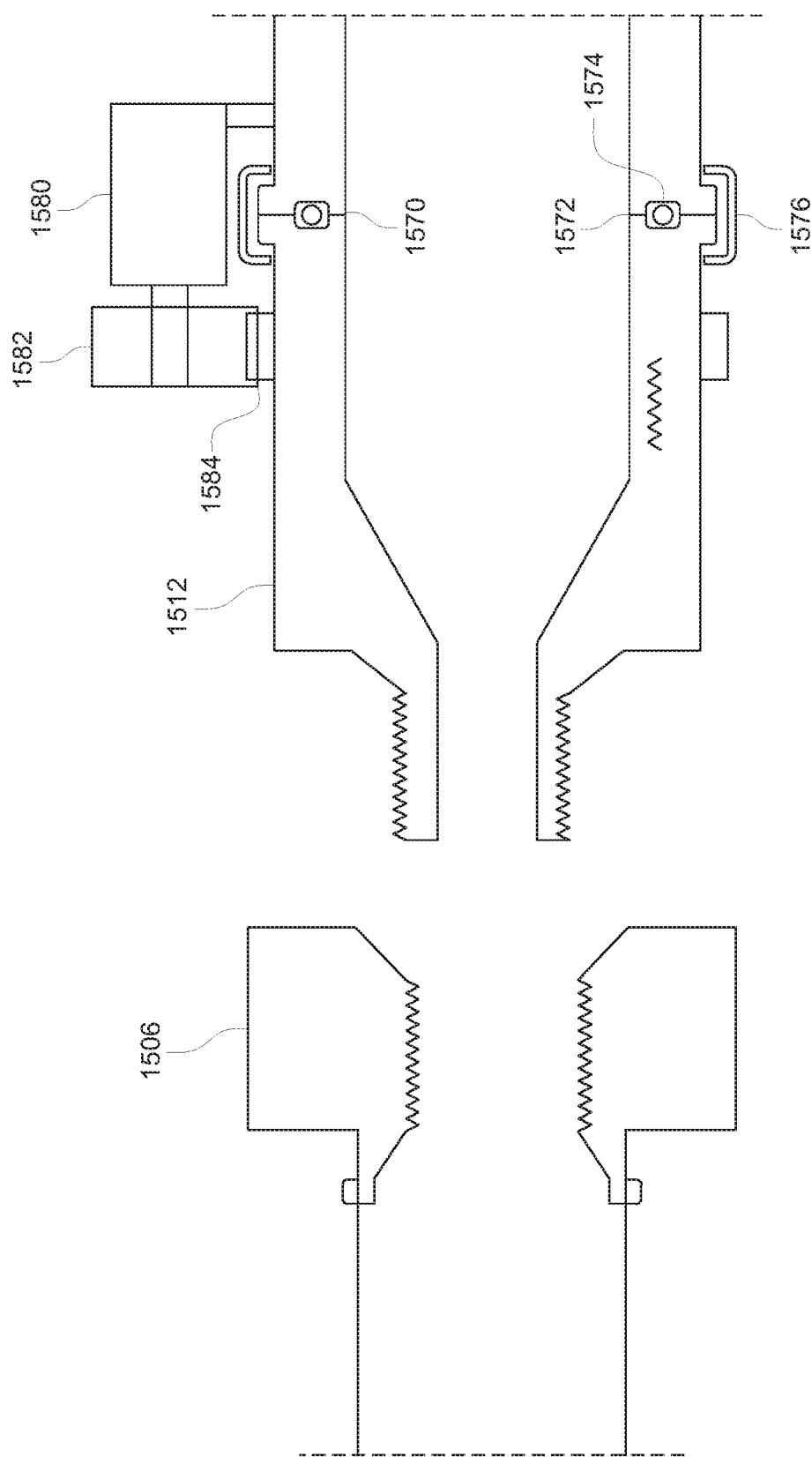
FIG. 35 is a schematic view of a primary connector for the crop input applicator vehicle of FIG. 33.

Further details of the primary connector 1512 are illustrated in FIG. 35. An end of the primary connector 1512 is designed with the same connecting features as the second end 1508 of the fluid conduits sections 1502. As the primary connector 1512 is driven along the guide rail 1510, the end is driven to allow for the connection to occur. In an embodiment where the first and second ends are threaded, the connecting end of the primary connector 1512 may be rotated at a rotation joint 1570. The rotation joint 1570 may include a sealing face 1572, a seal 1574 such as an o-ring, and a joint collar 1576 that allows rotation but not separation of the joint. The rotation may be driven by a motor 1580 through a gear 1582 aligned with mating teeth 1584 on the exterior of the primary connector 1512.

Figure 36:
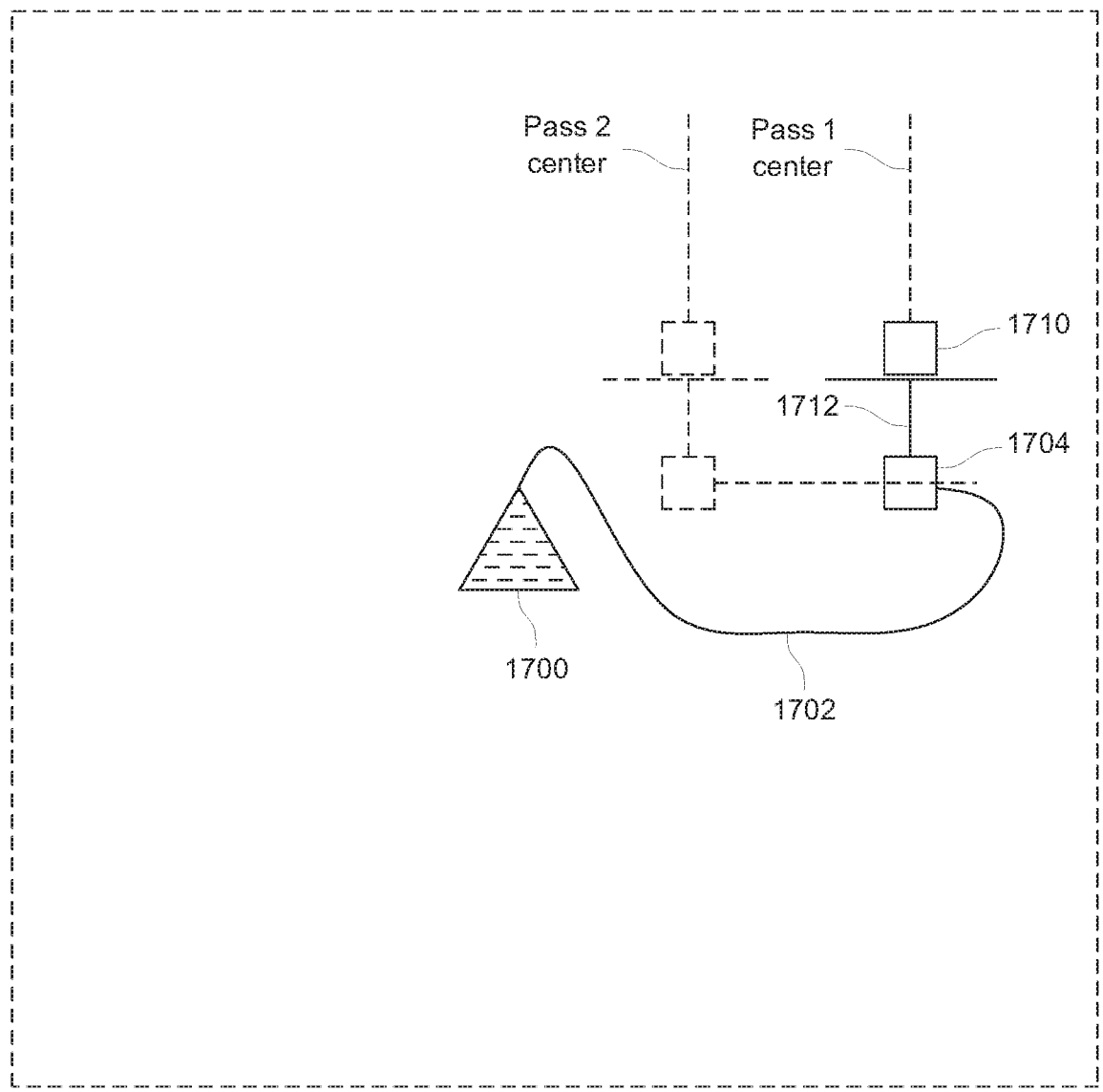
FIG. 36 is a schematic view of a field with a crop input applicator vehicle and a supply vehicle.

FIG. 36 schematically illustrates a field is shown that has a water supply 1700. The water supply may be a well, river, lake, or other body of water. The body of water could be supplied by tile laid out in the field. The water supply 1700 may be in the center of the field such as a pivot irrigation well. A drag hose 1702 is connected to the water supply 1700 and to a supply vehicle 1704. The supply vehicle 1704 carries a supply conduit 1712 stored on a reel that is connected to a crop applicator input vehicle 1710 to supply water through the vehicle 1710. The vehicle 1710 travels with the direction of the rows of plants while irrigating and drags the supply conduit 1712 off of the reel on the supply vehicle 1704. After vehicle 1710 finishes a pass and reaches the edge of the field, it reverses direction of travel and moves towards the supply vehicle 1704. It may be applying liquid both while traveling out and traveling back on that pass. The supply vehicle 1704 turns the reel to retract the conduit. After the vehicle 1710 reaches the supply vehicle 1704 it connects to the supply vehicle 1704 through the vehicle latch points (FIG. 4) and moves it to the center of the next pass. The drag hose 1702 remains connected to the supply vehicle 1704 and is drug along the ground until the center of the next pass is reached. The vehicle 1710 drives a path such that the drag hose 1702 maintains a J shape. Once the center of the new pass is reached, the vehicle 1710 disconnects from the supply vehicle 1704 and begins pulling out the conduit while irrigating that pass. The process repeats for any pass in the field that has been designated by the operator to be irrigated.

Figure 37:
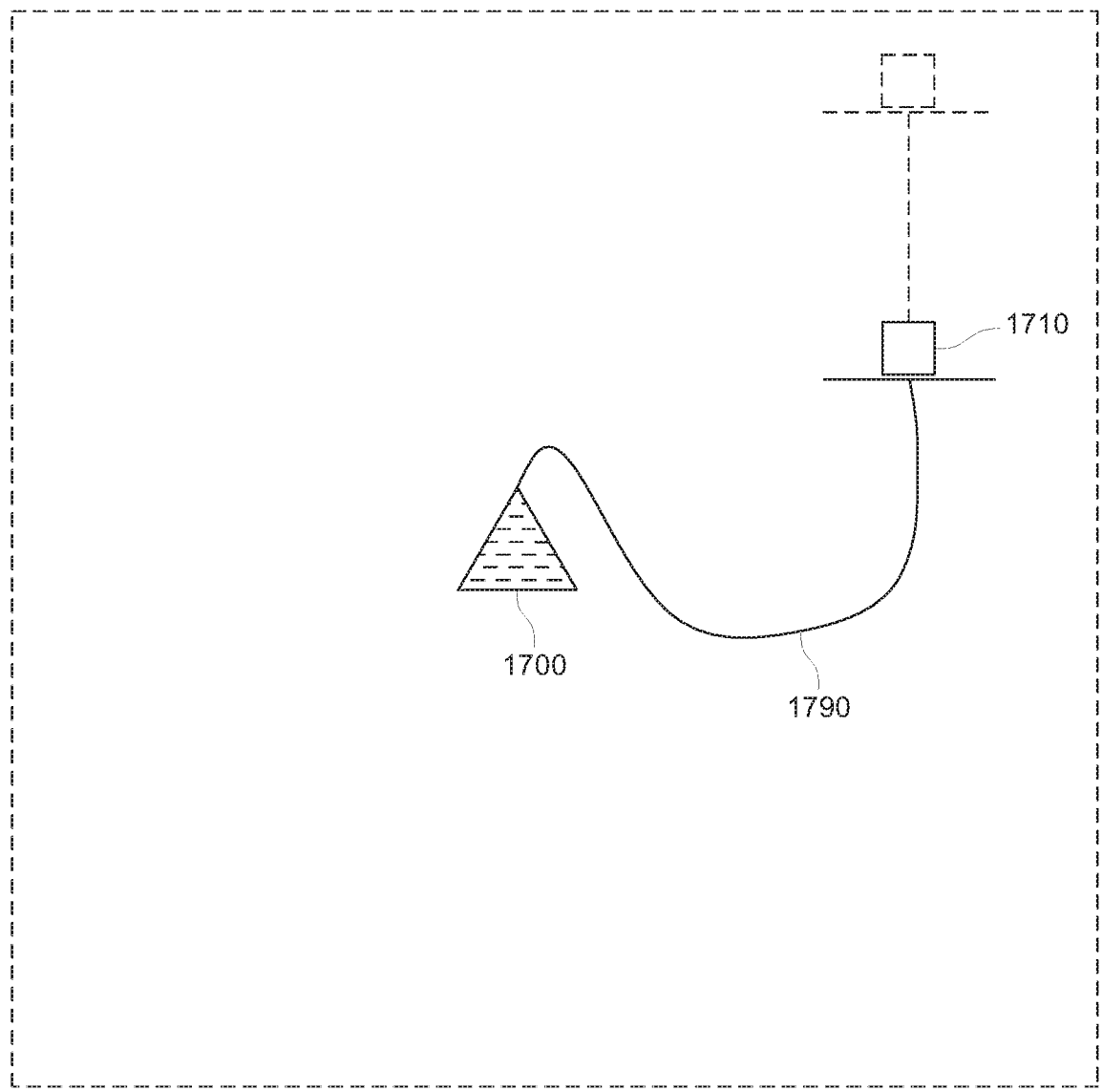
FIG. 37-39 are schematic view of operation of a crop input applicator vehicle.
Figure 38:
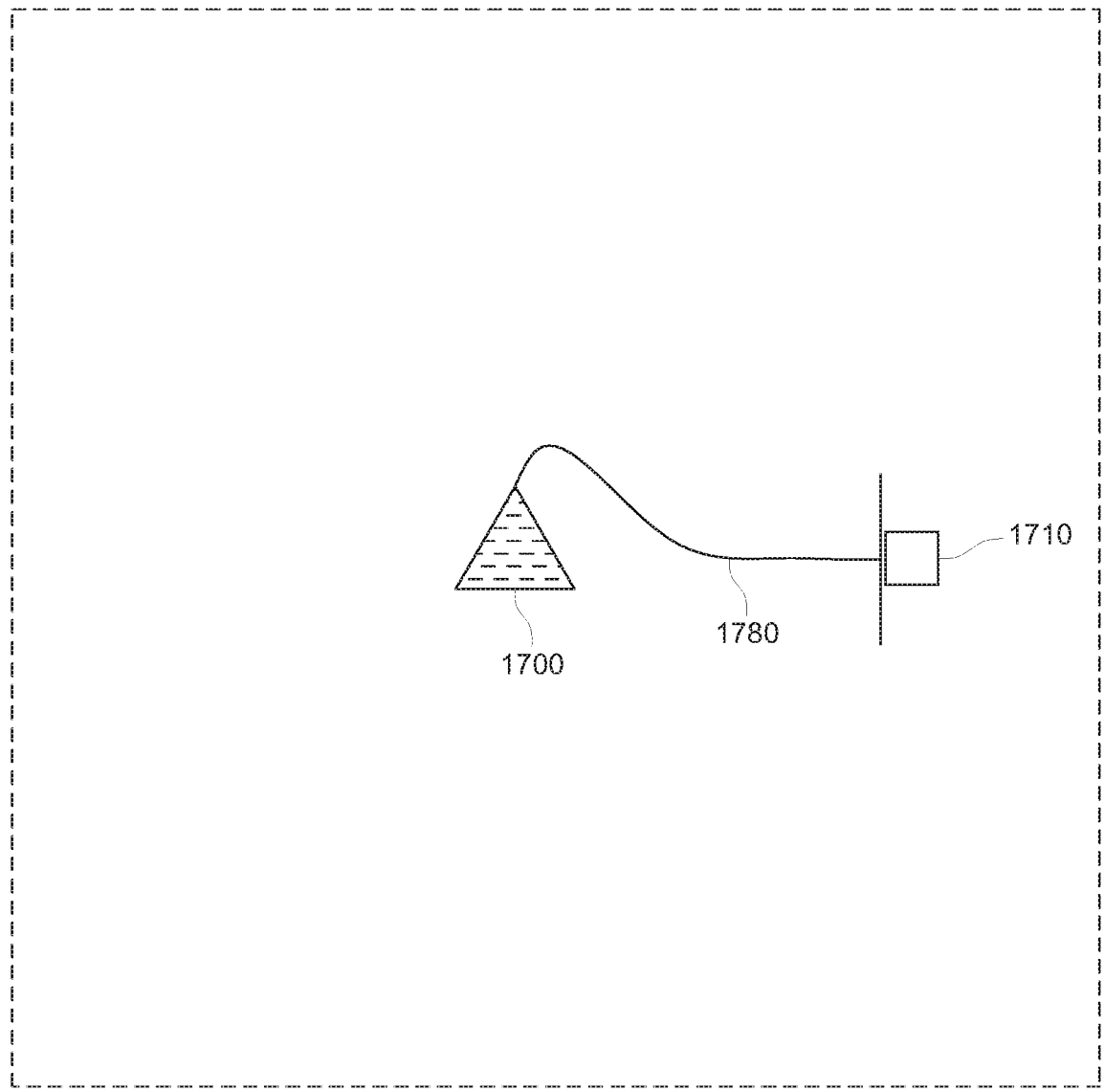
Figure 39:
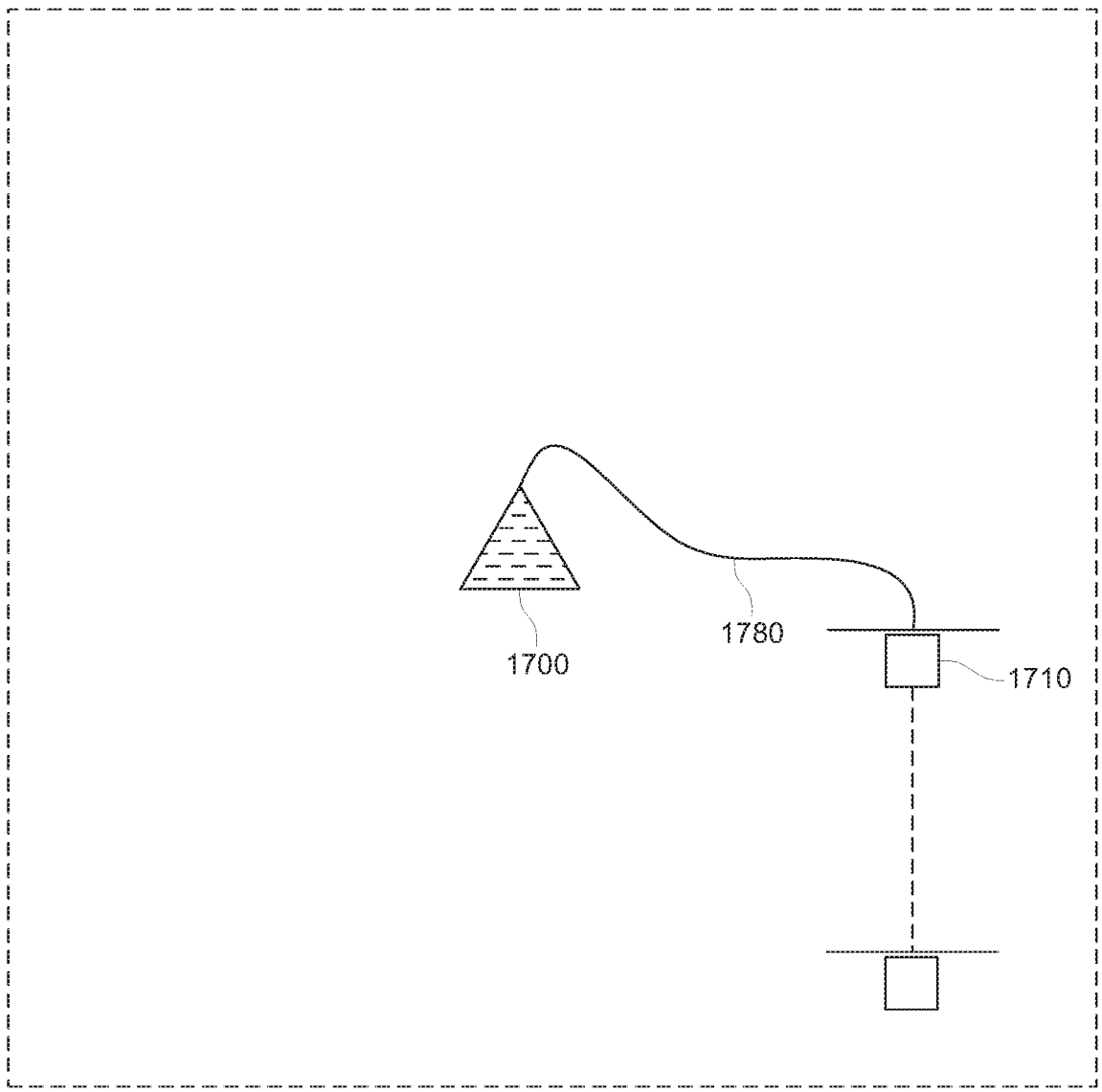

FIG. 37 illustrates water supply 1700 in a middle of the field. The vehicle 1710 while carrying a reel as discussed herein dispenses conduit 1790 as it travels through the middle of the field until it reaches the center of a pass of crop that has been designated by the operator to be irrigated. At that point, the vehicle turns 90 degrees to align with the rows and moves forward while applying liquid until it reaches the end of the pass. It then reveres to the middle of the field. It may irrigate while reversing as well. After reaching the middle of the field as illustrated in FIG. 38, the vehicle 1710 reverses towards the water supply 1700 to retract the conduit until the original 90 degree turn has been eliminated. Subsequently, as illustrated in FIG. 39, vehicle 1710 then turns 90 degrees in the opposite direction to complete the lower half of the pass to be irrigated and returns to the middle of the field. The vehicle then further extends or retracts conduit at the middle of the field to align with the center of a new pass to be irrigated and repeats the process.

Figure 40:
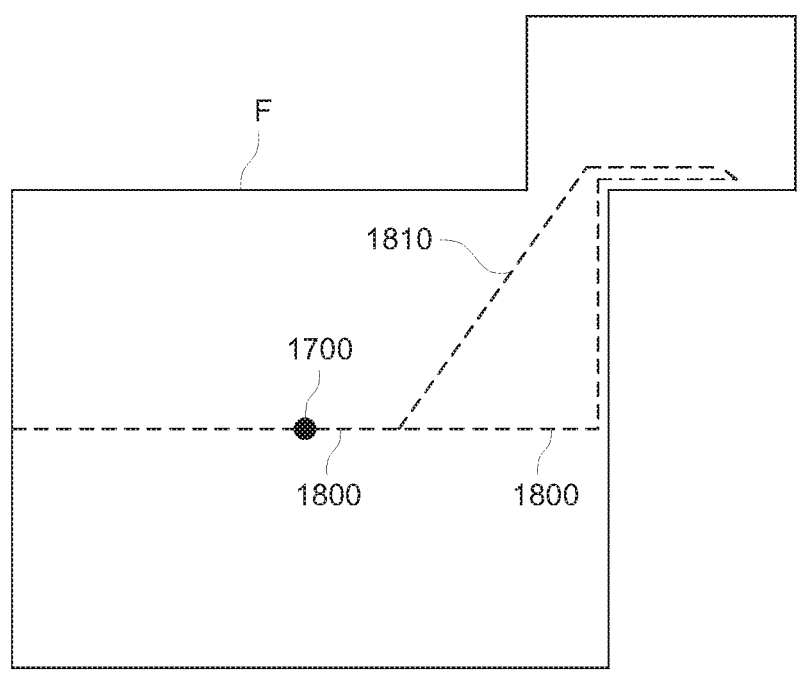
FIG. 40 is a schematic view of a field showing primary and secondary vehicle lines.

FIG. 40 illustrates multiple paths for a vehicle operating from a water supply 1700 in an irregular shaped field F that falls includes a primary path 1800 that stretches the length of one dimension of the field. As the vehicle 1710 travels to a location to apply a liquid, the vehicle 1710 may follow the primary line 1800 before turning ninety degrees to align with a pass and traveling along that pass until reaching the location to apply. In other embodiments, the vehicle 1710 may travel along a primary line 1800 for a portion of the field but then follow a secondary line 1810 connecting to the primary line 1800 but on a different heading to reach an area of the field in a shorter path than the primary line 1800. In some implementations, the vehicle 1710 uses less length of conduit by traveling and dispensing along the secondary line 1810 than if it had followed the primary line and turned ninety degrees to follow a pass to the field. Once reaching the application location, the secondary line 1810 may run parallel to the primary line 1800 and the vehicle 1710 may turn ninety degrees from the secondary line to align with a pass and apply liquid in that pass.

Various modifications to the embodiments and the general principles and features of the apparatus, systems, and methods described herein will be readily apparent to those of skill in the art. Thus, the foregoing description is not to be limited to the embodiments of the apparatus, systems, and methods described herein and illustrated in the drawing figures.

The invention claimed is:

1. A method of applying a crop input to a soil surface within a field, the field having adjacently spaced crop rows, the method comprising:
traversing the field with a crop applicator vehicle, the crop applicator vehicle having a frame supported by wheels, wherein at least one of the wheels is driven for rotation by a motor at a wheel drive speed, the frame supporting a rotatable reel above the adjacently spaced crop rows, a length of fluid conduit wound upon the rotatable reel, one end of the fluid conduit in communication with a crop input source;
driving rotation of the rotatable reel at a first rotational speed in a first rotational direction to begin causing a portion of the length of the fluid conduit to be dispensed from the rotatable reel onto the soil surface as the crop applicator vehicle traverses the field;
sensing a position of a part of the dispensed portion of the length of the fluid conduit extending between the rotatable reel and the soil surface;
comparing the sensed position of the part of the dispensed portion of the length of the fluid conduit relative to a target position, the target position indicative of a desired amount of tension on the part of the dispensed portion of the fluid conduit; and
adjusting the first rotational speed of the rotatable reel so that the sensed position of the part of the dispensed portion of the length of the fluid conduit approximates the target position.

2. The method of claim 1, further comprising:
adjusting the wheel drive speed based on the sensed position of the part of the dispensed portion of the length of the fluid conduit.

3. The method of claim 1, further comprising:
determining a target rate of application of the crop input for a defined area within the field; and
adjusting the wheel drive speed of the crop applicator vehicle based on the target rate.

4. The method of claim 1, wherein the crop input source is a pivot irrigation assembly.

5. The method of claim 1, wherein the crop applicator vehicle includes a sensor and a weed drop assembly, the method further comprising:
identifying a candidate plant with the sensor;
removing the candidate plant with the weed drop assembly.

6. The method of claim 1, wherein the crop input source is a supply line hydrant positioned within the field.

7. The method of claim 1, wherein the crop input source is a supply vehicle, the method further comprising:
connecting the supply vehicle to the crop applicator vehicle; and
moving the crop applicator vehicle in tandem with the supply vehicle.

8. The method of claim 1, wherein the frame further supports a container connectable to the crop input source, said container carrying a secondary crop input.

9. The method of claim 8, further comprising:
connecting a supply vehicle to the crop applicator vehicle, the supply vehicle carrying a supply of the secondary crop input, the supply vehicle delivering the supply of the secondary crop input to the container disposed on the crop applicator vehicle;
disconnecting the supply vehicle from the crop applicator vehicle before the crop applicator vehicle traverses the field.

10. The method of claim 1, further comprising:
driving rotation of the rotatable reel at a second rotational speed in a second rotational direction opposite the first rotational direction to begin causing the dispensed portion of the length of the fluid conduit to be rewrapped onto the rotatable reel as the crop applicator vehicle traverses the field in a second direction opposite the first direction;
sensing a position of the part of the dispensed portion of the length of the fluid conduit extending between the rotatable reel and the soil surface;
comparing the sensed position of the part of the dispensed portion of the length of the fluid conduit relative to the target position; and
adjusting the second rotational speed of the rotatable reel so that the sensed position of the part of the dispensed portion of the length of the fluid conduit approximates the target position.

11. The method of claim 1, further comprising:
adjusting a position of the length of fluid conduit relative to the rotatable reel as the length of fluid conduit is dispensed from the rotatable reel.

12. A crop applicator input vehicle, comprising:
a frame supported by wheels positioned on a ground surface;

a motor connected to at least one of the wheels to drive rotation thereof;

a rotatable reel supported by the frame;

a length of fluid conduit wound upon the rotatable reel, one end of the fluid conduit configured to be connected to a crop input source and a portion of the length of fluid conduit positioned between the rotatable reel and the ground surface;

a control assembly including a reel drive and a conduit sensor, the reel drive coupled to the rotatable reel to control a rotational speed of the rotatable reel, the conduit sensor coupled to the length of fluid conduit and configured to sense a conduit position of the portion of the length of fluid conduit, said position indicative of an amount of tension in the portion of the length of conduit, the control assembly operable to compare the conduit position with a target position and adjust the rotational speed such that the conduit position approximates the target position while the motor dives rotation of said at least one of the wheels.

13. The crop applicator input vehicle of claim 12, wherein the control assembly is further configured to adjust a wheel drive speed of the at least one of the wheels based on the sensed position of the conduit portion of the length of the fluid conduit.

14. The crop applicator input vehicle of claim 12, wherein the control assembly is further configured to determine a target rate of application of the crop input for a defined area within a field and adjust a wheel drive speed of the crop applicator vehicle based on the target rate.

15. The crop applicator input vehicle of claim 12, wherein the conduit sensor includes a rotating arm in contact with the length of fluid conduit and a rotation sensor connected to the rotating arm, the rotation sensor configured to detect a change in a position of the rotating arm relative to the frame.

16. The crop applicator input vehicle of claim 12, further comprising a conduit control assembly configured to adjust a position of the length of the fluid conduit as the portion enters and leaves the rotatable reel.

17. A system for applying crop inputs in a field, comprising:

a crop input source positioned in the field;

a crop applicator input vehicle, including:

a frame supported by wheels positioned on a ground surface of the field;

a motor connected to at least one of the wheels to drive rotation thereof;

a rotatable reel supported by the frame;

a length of fluid conduit wound upon the rotatable reel, one end of the fluid conduit configured to be connected to the crop input source and a portion of the length of fluid conduit positioned between the rotatable reel and the ground surface;

a control assembly including a reel drive and a conduit sensor, the reel drive coupled to the rotatable reel to control a rotational speed of the rotatable reel, the conduit sensor coupled to the length of fluid conduit and configured to sense a conduit position of the portion of the length of fluid conduit, said position indicative of an amount of tension in the portion of the length of conduit, the control assembly operable to compare the conduit position with a target position and adjust the rotational speed such that the conduit position approximates the target position while the motor drives rotation of said at least one of the wheels.

18. The system of claim 17, wherein the control assembly is further configured to adjust a wheel drive speed of the at least one of the wheels based on the sensed position of the conduit portion of the length of the fluid conduit.

19. The system of claim 17, wherein the control assembly is further configured to determine a target rate of application of the crop input for a defined area within a field and adjust a wheel drive speed of the crop applicator vehicle based on the target rate.

20. The system of claim 17, wherein the conduit sensor includes a rotating arm in contact with the length of fluid conduit and a rotation sensor connected to the rotating arm, the rotation sensor configured to detect a change in a position of the rotating arm relative to the frame.

21. The system of claim 17, further comprising a conduit control assembly configured to adjust a position of the length of the fluid conduit as the portion enters and leaves the rotatable reel.

22. The system of claim 17, wherein the crop input source is a pivot irrigation assembly.

23. The system of claim 17, wherein the crop input source is a supply line hydrant.

24. The system of claim 17, wherein the crop input source is a wellhead.

* * * * *